United States Patent
Kobayashi et al.

(10) Patent No.: US 7,470,481 B2
(45) Date of Patent: Dec. 30, 2008

(54) FUEL CELL SYSTEM

(75) Inventors: Koji Kobayashi, Tokyo (JP); Munehisa Horiguchi, Aichi (JP)

(73) Assignee: KabushikiKaisha Equos Research (JP)

( * ) Notice: Subject to any disclaimer, the term of this patent is extended or adjusted under 35 U.S.C. 154(b) by 449 days.

(21) Appl. No.: 10/670,316

(22) Filed: Sep. 26, 2003

(65) Prior Publication Data

US 2004/0067399 A1    Apr. 8, 2004

(30) Foreign Application Priority Data

Sep. 27, 2002    (JP)    .............................. 2002-284567

(51) Int. Cl.
*H01M 8/04* (2006.01)
*H01M 8/12* (2006.01)

(52) U.S. Cl. .............................. 429/25; 429/22; 429/13; 429/39

(58) Field of Classification Search .................. 429/11, 429/13, 25, 34, 39
See application file for complete search history.

(56) References Cited

U.S. PATENT DOCUMENTS

| | | | | |
|---|---|---|---|---|
| 5,366,821 A | * | 11/1994 | Merritt et al. | 429/21 |
| 6,896,985 B2 | * | 5/2005 | Horiguchi et al. | 429/22 |
| 2003/0035986 A1 | * | 2/2003 | Yang | 429/25 |

* cited by examiner

*Primary Examiner*—Patrick Ryan
*Assistant Examiner*—Ben Lewis
(74) *Attorney, Agent, or Firm*—Bacon & Thomas, PLLC

(57) ABSTRACT

A fuel cell system includes at least one fuel cell stack having a fuel chamber including a fuel electrode (anode), an air chamber including an oxygen electrode (cathode), an electrolyte layer interposed between the fuel electrode and the oxygen electrode, and a pressure regulating valve for regulating supply pressure of fuel gas (hydrogen gas) supplied to the fuel chamber. The pressure regulating valve sets the supply pressure of the fuel gas when the fuel cell stack starts up power generation at a level higher than the supply pressure of the fuel gas during normal power generation in which the fuel cell stack is generating electric power.

10 Claims, 23 Drawing Sheets

FUEL CELL SYSTEM

FIELD OF THE INVENTION

The present invention is related to a fuel cell system, and more particularly to a fuel cell system capable of supplying fuel gas to a fuel chamber in a short time at the startup of generation.

DESCRIPTION OF THE PRIOR ART

Conventionally, in fuel cell systems using a polymer electrolyte membrane (layer), fuel gas and oxidizing gas are ionized on both sides of the electrolyte layer, and these ionized gases electrochemically react across the electrolyte layer. Therefore, as long as the fuel gas and the oxidizing gas are present across the electrolyte layer, the electrochemical reaction continues. In the conventional system, in order to stop the operation of the fuel cell, the system stops the supply of both the fuel gas and the oxidizing gas to the fuel cell, and feeds a purge gas such as air or the like to the fuel chamber containing a fuel electrode, in place of the fuel gas, thereby preventing the electrochemical reaction after stopping the fuel cell.

Further, at the time of start-up in the conventional fuel cell system, the purge gas is displaced by feeding the fuel gas to the fuel chamber.

In this regard, if the fuel in one region is more concentrated than other regions and the oxidizing gas is more concentrated in one region than in other regions in the fuel chamber, namely, a state wherein the fuel gas and the oxidizing gas are unevenly distributed in the fuel chamber, one such region may form a localized cell, and an electric current will flow to that "localized cell" in a direction reverse that in normal power generation. In particular, this corrodes the oxygen electrode, and this corrosion causes the fuel cell system to deteriorate rapidly.

In the conventional system, the fuel gas supplied to the fuel chamber at the time of start-up is at a gas pressure the same as the gas pressure of the fuel gas supplied to the fuel chamber during normal power generation of the fuel cell. Thus, when the fuel gas is supplied to the fuel chamber at the operation start-up time, uneven distribution of the fuel and oxidizing gases may occur in the fuel chamber instantaneously and causes an undesirable electrochemical reaction, thereby injuring the oxygen electrode.

SUMMARY OF THE INVENTION

It is an object of the present invention to provide a fuel cell system that can inhibit the electrodes from deteriorating.

In order to achieve the above object, the present invention provides a fuel cell system which comprises:

at least one fuel cell having a fuel chamber including a fuel electrode, an oxygen chamber including an oxygen electrode and an electrolyte layer interposed between the fuel electrode and the oxygen electrode; and pressure regulating means for regulating a supply pressure of fuel gas to be supplied to the fuel chamber at start-up and during normal power generation;

wherein the supply pressure of the fuel gas at the time of start-up is higher than the supply pressure of the fuel gas during normal power generation in which the fuel cell is generating electric power.

In the fuel cell system of the present invention, it is preferred that the pressure regulating means includes a pressure regulator valve and control means for controlling the pressure regulator valve.

It is preferred that the fuel cell system of the present invention further has a fuel gas supply line through which the fuel gas is supplied at the time of start-up of power generation wherein the pressure regulating means includes two regulator valves that respectively provide different supply pressures, a switching valve arranged on the line, and switching means for opening and closing the switching valve.

Further, it is preferred that in normal power generation the fuel cell be connected to an external load.

It is preferred that the fuel cell system of the present invention further comprises a start switch for turning on and off of the fuel cell system wherein the start-up time for power generation includes a predetermined period of time after the start switch is turned on.

It is preferred that the start-up time for power generation by the fuel cell includes the case where the start switch is turned on after a lapse of a predetermined period of time after the start switch has been turned off in the normal power generation state.

In another aspect, the present invention provides a fuel cell system comprising:

at least one fuel cell having a fuel chamber including a fuel electrode, an oxygen chamber including an oxygen electrode and an electrolyte layer interposed between the fuel electrode and the oxygen electrode;

a fuel gas concentration sensor for detecting the concentration of a fuel gas discharged from the fuel chamber; and pressure regulating means for regulating a supply pressure of the fuel gas supplied to the fuel chamber based on the detected fuel gas concentration;

wherein the pressure regulating means provides a higher pressure of the fuel gas at the time of fuel cell start-up than during normal power generation in which the fuel cell is generating electric power.

In the fuel cell system of the present invention, it is preferred that the pressure regulating means switches from the start-up supply pressure to the supply pressure for normal power generation state when the fuel gas concentration detected by the fuel gas concentration sensor becomes higher than a predetermined fuel gas concentration. It is preferred that the predetermined fuel gas concentration is 95 percent by volume.

In the present invention, it is preferred that the fuel cell system further comprises an oxygen concentration sensor for detecting the concentration of oxygen discharged from the fuel chamber, wherein the pressure regulating means switches from the pressure of the fuel gas at the time of start-up time to the pressure for the normal power generation when the fuel gas concentration detected by the fuel gas concentration sensor becomes higher than a predetermined fuel gas concentration and the oxygen concentration detected by the oxygen concentration sensor becomes lower than a predetermined oxygen concentration. In this case, it is preferred that the predetermined fuel gas concentration is 95 percent by volume and the predetermined oxygen gas concentration is 1 percent by volume.

In yet another aspect the present invention provides a fuel cell system comprising:

a start switch for turning on or off of the fuel cell system;

at least one fuel cell having a fuel chamber including a fuel electrode, an air chamber including an oxygen electrode and an electrolyte layer interposed between the fuel electrode and the oxygen electrode;

a timer for measuring a period of time lapsed after the start switch has been turned off; and pressure regulating means for regulating supply pressure of fuel gas supplied to the fuel chamber;

wherein the pressure regulating means sets the supply pressure of the fuel gas at the time of fuel cell start-up higher than the supply pressure of the fuel gas during normal power generation, and wherein the start switch is turned on when the period of time lapsed, as measured by the timer, exceeds a predetermined period of time.

The above objects and other objects, structures and advantages of the present invention will be apparent when the following description of the preferred embodiment with reference to the appended drawings.

DETAILED DESCRIPTION OF THE PREFERRED EMBODIMENTS

The preferred embodiments of a fuel cell system according to the present invention are described below with reference to the appended drawings.

Figure 1:
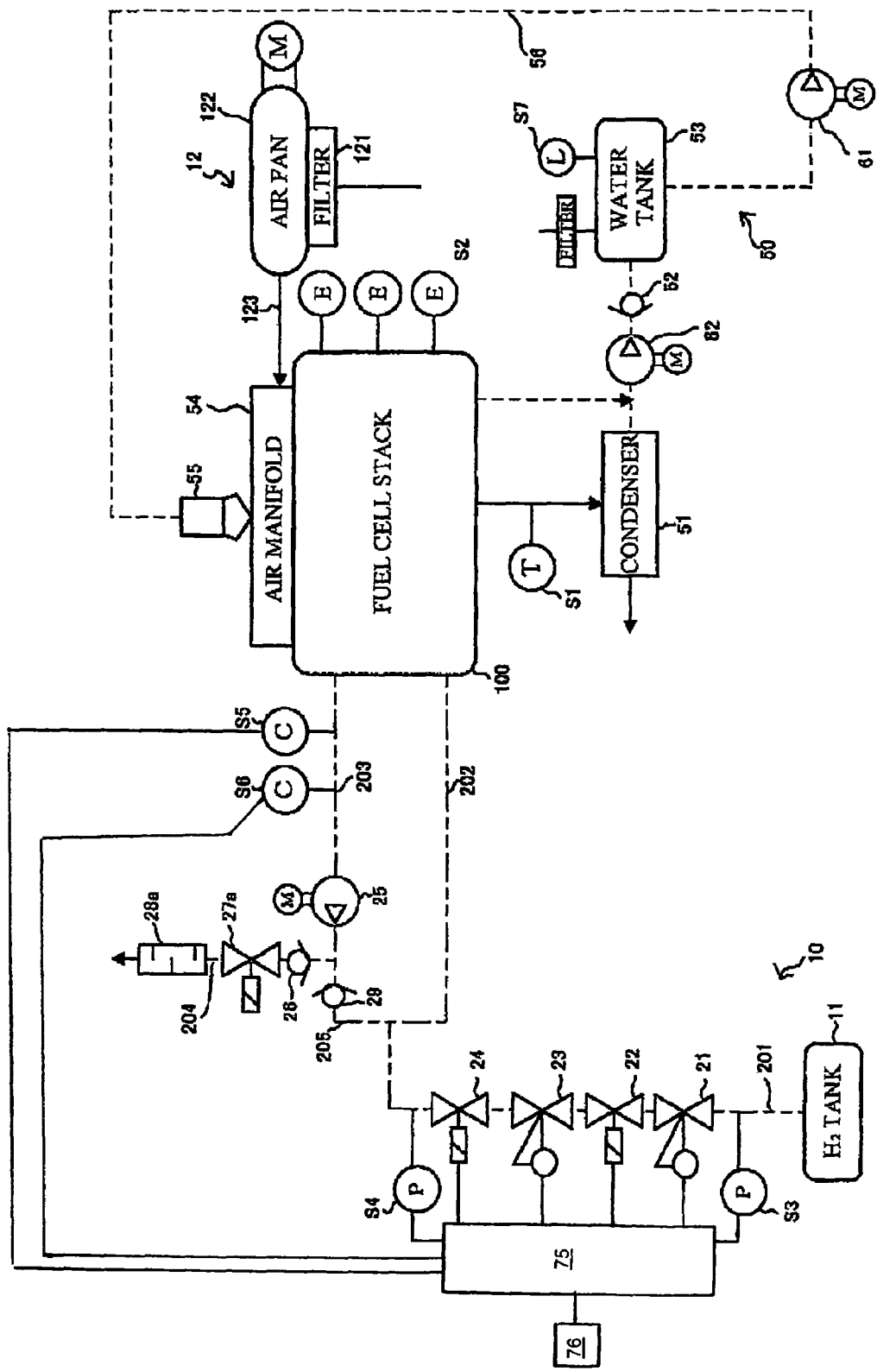
FIG. 1 is a block diagram illustrating the fuel cell system of one embodiment according to the present invention.

In the first embodiment, a fuel cell system is carried on an electric car as shown in FIGS. 1-6. FIG. 1 is a block diagram illustrating the fuel cell system 1 of the first embodiment of the present invention. As shown schematically in FIG. 1, the fuel cell system 1 includes a fuel cell stack 100, an air supply system 12, a fuel gas supply system 10 including a plurality of high-pressure hydrogen tanks 11 (hydrogen supply means), and a water supply system 50. The fuel cell stack 100 is composed of a plurality of fuel cell unit cells 15 and fuel cell separators 13, which are stacked alternately.

The separator 13 comprises current collecting members 3, 4 that are connected to the electrodes of the unit cell 15 for output of electric current, and frame elements 8, 9 externally covering a peripheral edge portion of current collecting members 3, 4.

The current collecting members 3, 4 are each made of a metal plate. The metal has electric conductivity and corrosion resistance. For example, the metal may be stainless steel, a nickel alloy, a titanium alloy or the like treated with a corrosion-resistant electric conductivity process.

The current collecting member 3 abuts a fuel electrode (anode) of the unit cell 15, while the current collecting member 4 abuts an oxygen electrode (cathode) of the unit cell 15. The current collecting member 3 is made in the form of a rectangular plate, comprising a plurality of columnar protruding portions 32 provided on a surface thereof and formed by a pressing process. The columnar protruding portions 32 are vertically and horizontally arranged at even intervals along both the short dimension and the long dimension of the plate. Between the columnar protruding portions 32, hydrogen passages 301 are formed as grooves extending along the long dimension (in the lateral direction in FIG. 2), while hydrogen passages 302 are formed as grooves arranged between the columnar protruding portions 32 and extending along the short dimension of the plate 3 (in the longitudinal direction in FIG. 2). The plane defined by the tips of the columnar protruding portions 32 serves as an abutting portion 321 to abut the fuel electrode. The backsides of the columnar protruding portions 32 serve as recesses 33. Apertures 35 are formed at opposing ends of the current collecting member 3, and form hydrogen supply passages when the separators 13 are stacked.

The current collecting member 4 is also in the form of a rectangular plate, comprising a plurality of protruding portions 42 arranged on a surface thereof and formed by a pressing process. The protruding portions 42 are linearly arranged at even intervals parallel to the short edge of the plate. Grooves are formed between the protruding portions 42 and constitute air passages 40. The plane defined by the tips of the protruding portions 42 serves as an abutting portion 421 to abut the oxygen electrode. The backside of each protruding portion 42 serves as a canal form hollow portion that forms a cooling passage 41. The air passages 40 and the cooling passages 41 extend to the ends of the plate, and both ends thereof open at the ends of the plate. Apertures 48 are formed at opposing ends of the current collecting member 4 and form a hydrogen supply passage when the separators 13 are stacked.

Figure 3:
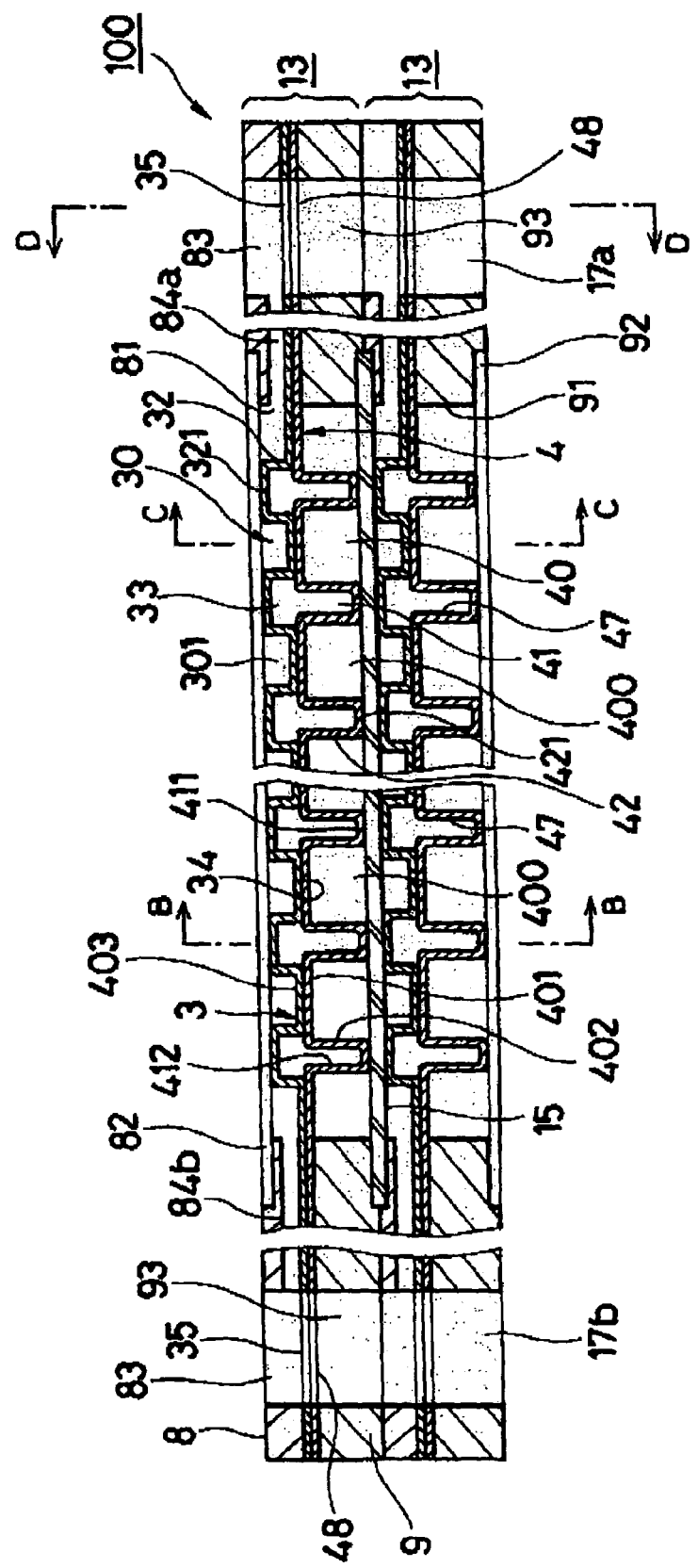
FIG. 3 is a partial cross-section taken along line A-A in FIG. 2 illustrating the fuel cell stack including a fuel cell separator.
Figure 4:
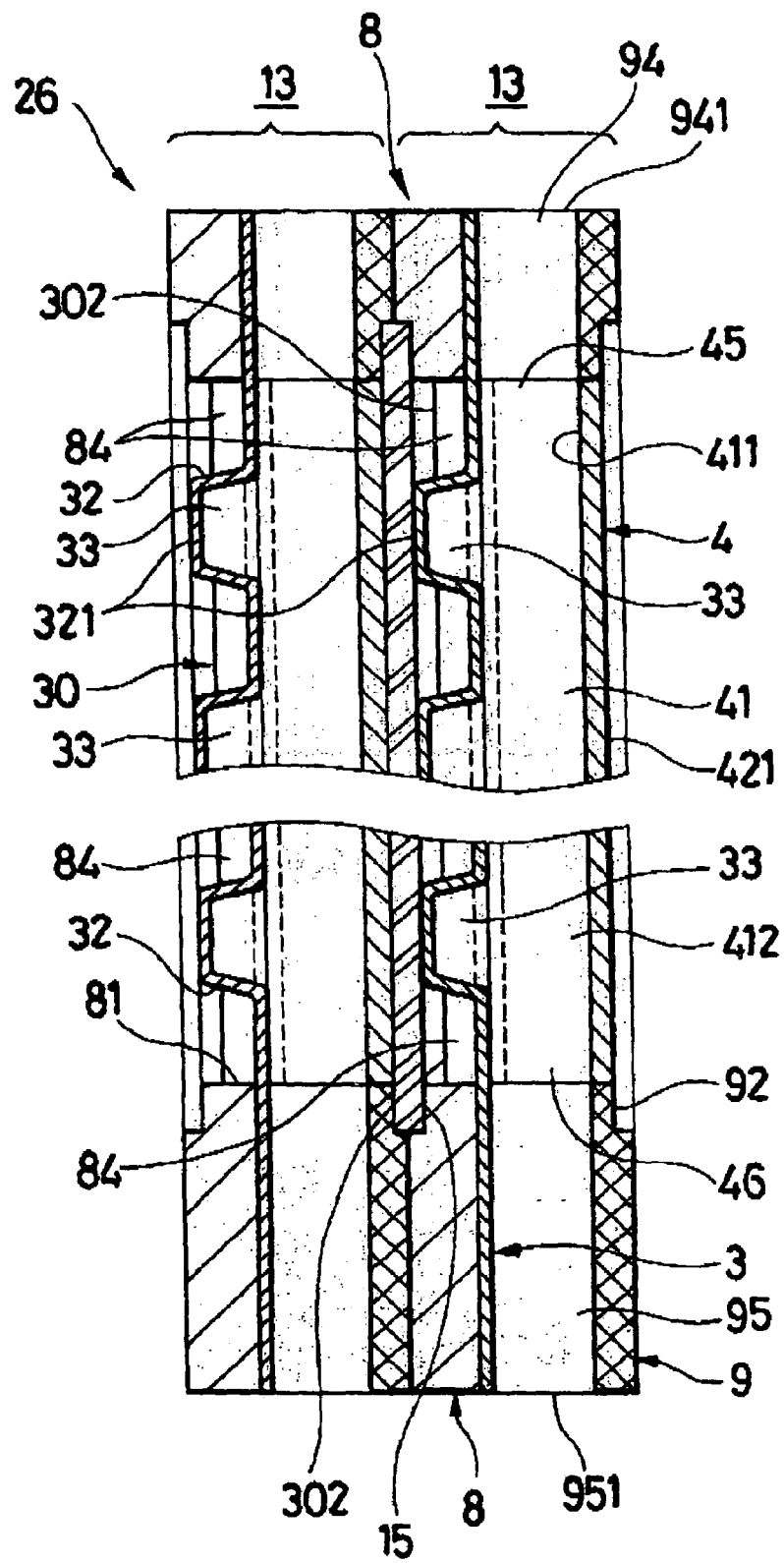
FIG. 4 is a partial cross-section taken along line B-B in FIGS. 2 and 3.
Figure 5:
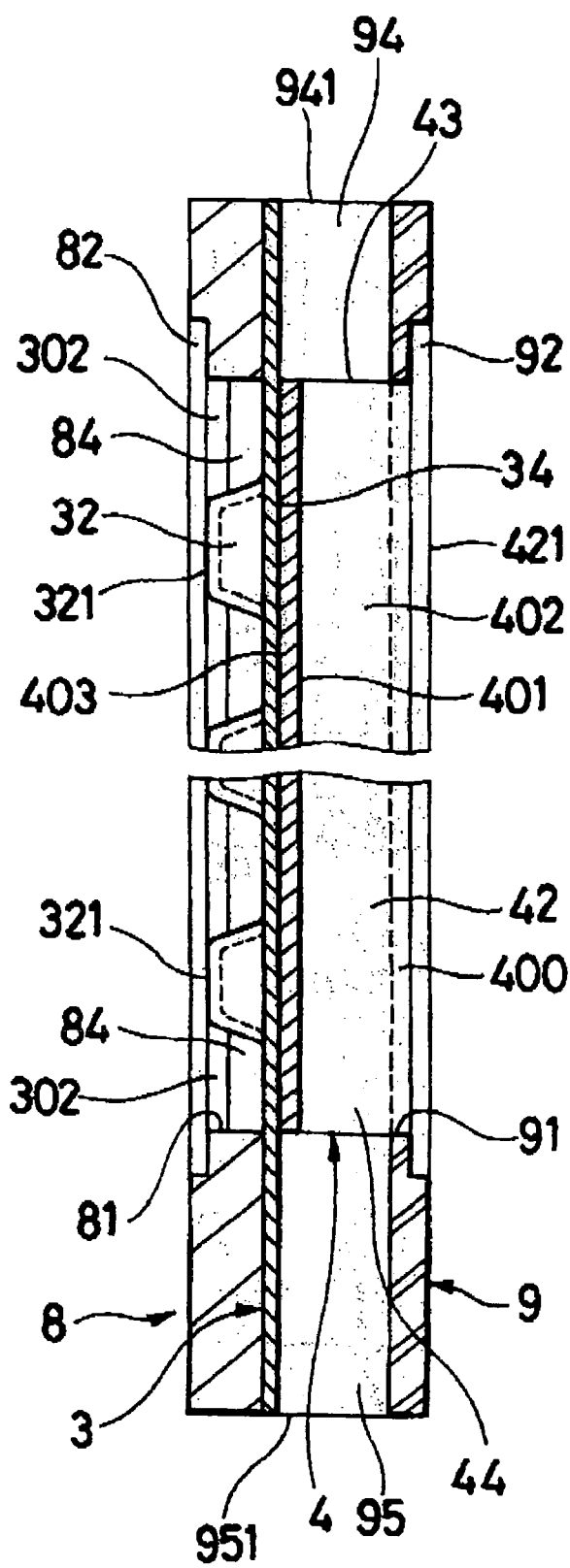
FIG. 5 is a partial cross-section of the fuel cell separator taken along line C-C in FIGS. 2 and 3.

The current collecting members 3, 4, having above structure are stacked and fixed so that the columnar protruding portions 32 and the protruding portions 42 are arranged outside of the stack. In this case, the backside surfaces 34 of the hydrogen passages 301, 302 abut on the backside surface 403 of the air passage 40, which makes it possible to establish a conductive path. Further, as shown in FIG. 4, the cooling passage 41 is formed by stacking the current collecting members 3, 4, and the recess 33 forms a part of the cooling passage 41. On the other hand, as shown in FIGS. 3 and 5, the air passage 40 is formed as a tubular passage by being stacked on the cathode (oxygen electrode) 15 which closes the opening 400 of the groove. Thus, the oxygen electrode forms a part of the inner wall of the air passage 40. Oxygen and water are supplied to the oxygen electrode of the unit cell 15 from the air passage 40.

The opening at one end of the air passage 40 forms an inflow port 43 at which the air and water are introduced, while the opening at the other end of the air passage 40 forms an outflow port 44 at which the air and water exit. The opening at one end of the cooling passage 41 forms an inflow release port 45 at which the air and water are introduced, while the opening at the other end of the cooling passage 41 forms an outflow release port 46 at which the air and water exit. In the structure described above, the air passage 40 and the cooling passage 41 are arranged parallel and alternately, and adjoin each other across a sidewall 47. In this way, the inflow ports 43 and the inflow release ports 45 are also arranged alternately. Since the air and water flow along the sidewall 47, the sidewalls 47 function as cooling fins.

By arranging the air passage 40 and the cooling passage 41 parallel and alternately, it becomes possible to improve the cooling efficiency of the fuel cell, allowing even cooling of the fuel cell.

Figure 2:
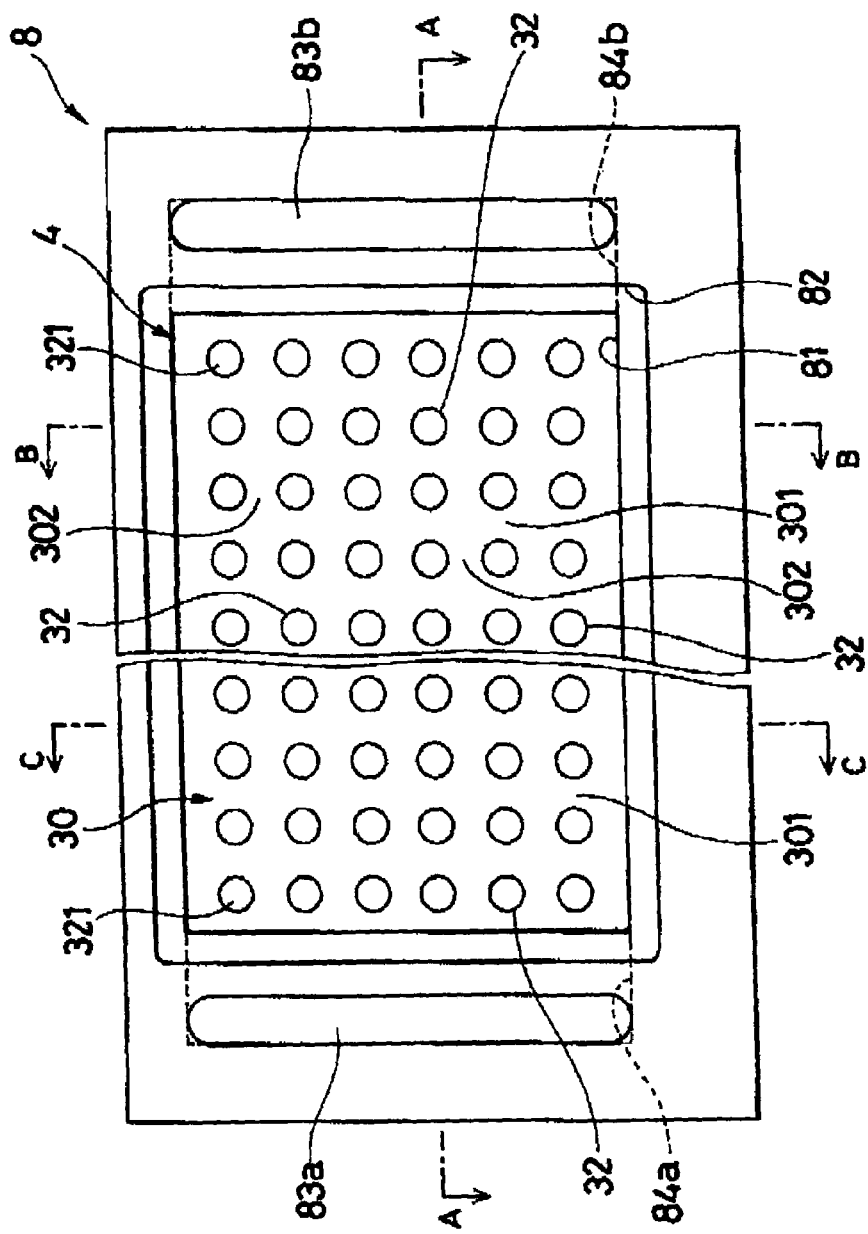
FIG. 2 is a front view of the fuel cell separator.

The frame elements 8, 9 are respectively stacked on the current collecting members 3, 4. As shown in FIG. 2, the frame element 8 stacked on the current collecting member 3 has the same size as the current collecting member 3, and a window 81 for receiving the columnar protruding portions 32 is formed at the center thereof. Further, apertures 83a, 83b are formed at positions corresponding to the positions of the apertures 35 of the current collecting member 3 adjacent opposing ends of the frame element 8. A concavity 84 is formed in the surface abutting on the current collecting member 3 between each of the apertures 83a and 83b and the window 81 to provide a hydrogen flow passage. In the surface opposite to the surface abutting the current collecting member 3, the concave portion, which extends along the edge of the window 81 provides a recess 82 for receiving the unit cell 15. A fuel chamber is defined by the surface of the fuel electrode 15 accommodated in the recess 82, the hydrogen passages 301, 302, and the window 81.

Figure 6:
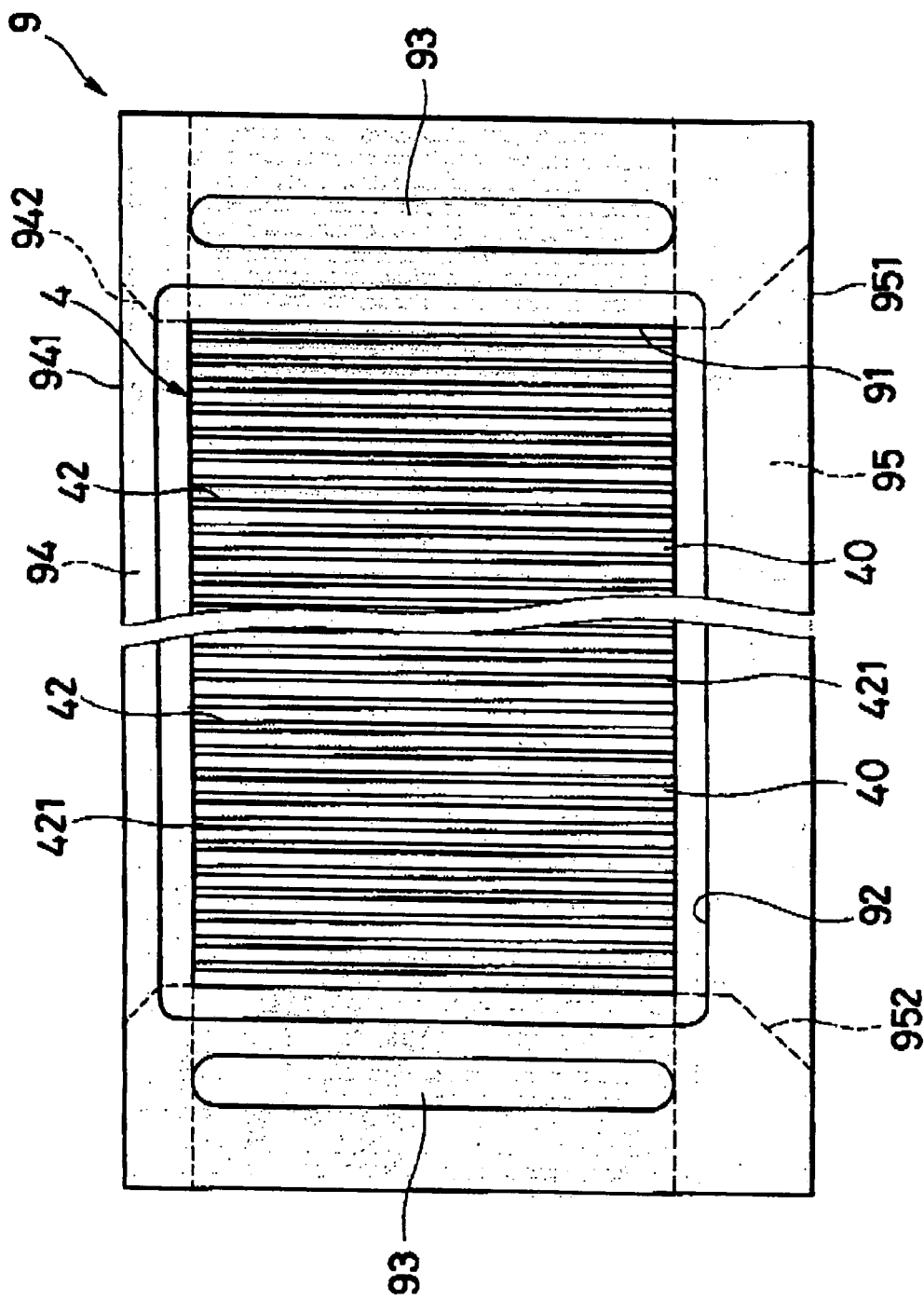
FIG. 6 is a rear view of the fuel cell separator.

The frame element 9 stacked on the current collecting member 4 has the same size of the frame element 8, and a window 91 for receiving the protruding portions 42 is formed at the center thereof. As seen in FIG. 6, apertures 93 are formed at positions corresponding to the positions of the apertures 83 of the frame element 8 adjacent opposing ends of the frame element 9. The surface of frame element 9 which receives the current collecting member 4 of the frame element 8 has grooves 94, 95 formed along a pair of opposing long edges of the flame element 9 which serve as air flow passages when the current collecting members 3, 4 are stacked. One end of the air flow passage 94 is connected to an opening 941 formed on an end face on the long edge side of the frame element 9, while the other en thereof is connected to the inflow port 43 of the air passage 40 and to the inflow release port 45 of the cooling passage 41.

In the air flow passage (groove) 94 located on the upstream side, an inner wall of the end portion thereof forms a tapered surface 942 so that the cross-sectional area decreases gradually from opening 941 toward the air passage 40, allowing water to be sprayed into the air flow passage 94 from an a manifold 54 (described later). On the other hand, one end of an air stream passage 95 located on the downstream side is connected to the outflow port 44 of the air passage 40 and the inflow release port 45 of the cooling passage 41, while the other end is connected to an opening 951 formed at the end face on the long edge side of the frame element 9. In the air flow passage 95, an inner wall forms a tapered surface 952 so that the cross-sectional area decreases gradually from the opening 951 toward the air passage 40. Even if the fuel cell stack 100 is inclined, discharge of the water is maintained by the tapered surface 952.

Further, in the surface of the frame element 9 opposite the surface abutting the current collecting member 4, a recess 92 extending along the window 91 receives the unit cell 15.

Figure 7:
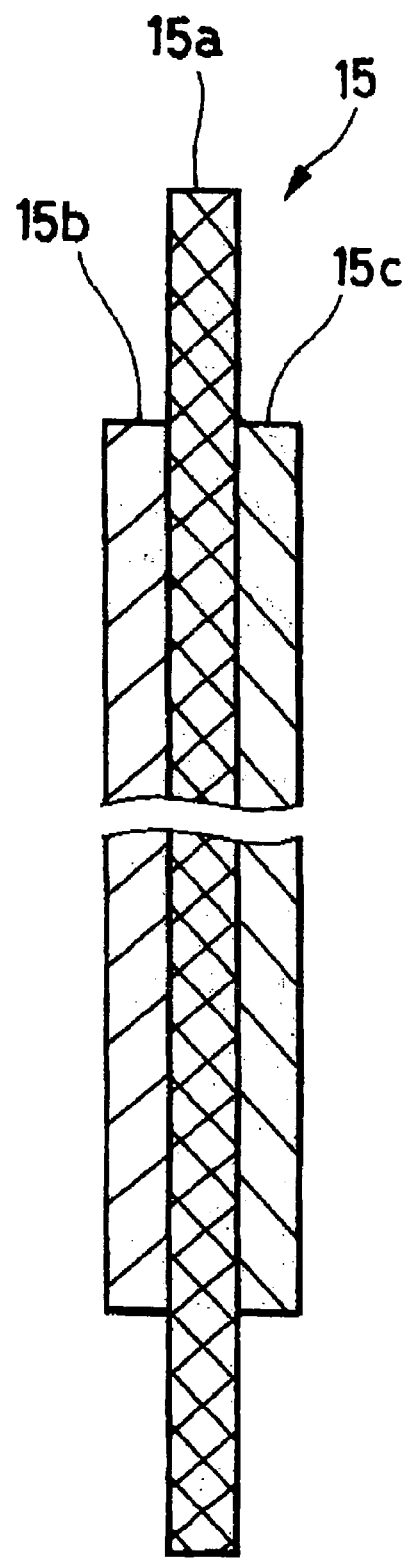
FIG. 7 is an enlarged cross-section diagram of the unit cell.

FIG. 7 is an enlarged cross-sectional diagram of the unit cell 15. Unit cell 15 includes a solid polymer electrolyte membrane 15a, an oxygen electrode 15b, and a fuel cell electrode 15c, respectively stacked at opposing sides of the solid polymer electrolyte membrane 15a. The solid polymer electrolyte membrane 15a has a size corresponding to the size of the recesses 82, 92, and the oxygen electrode 15b and the fuel electrode 15c each has a size corresponding to the size of the windows 81, 91. Since the thickness of the unit cell 15 is extremely thinner than either of the frame elements 8, 9 and the current collecting members 3, 4, it is shown in the drawings as a unitary element.

A surface treatment is applied to inner walls of the air passage 40 and the cooling passage 41 to make the walls hydrophilic. The surface treatment is applied to the inner walls so that the contact angle between the inner surface of a wall and water is less than 40 degrees, preferably less than 30 degrees. Application of a hydrophilic agent to the surface is adopted as this treatment. The agent applied may be, for example, polyacrylamide, polyurethane resin, titanium oxide (titanium dioxide), or the like.

Figure 8:
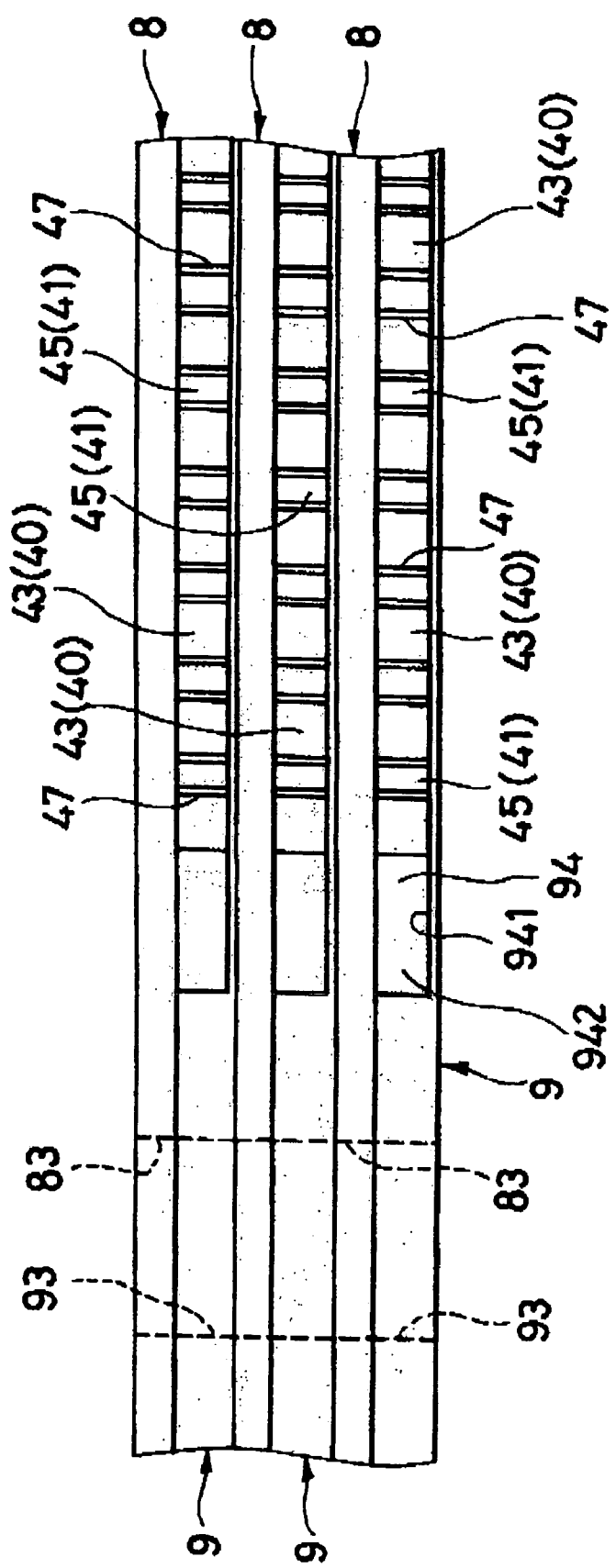
FIG. 8 is a partial plan view of the fuel cell stack.

The separator 13 is constructed so that the current collecting members 3, 4 are held by the frame elements 8, 9 having above-described structure. The fuel cell stack 100 is constructed by stacking the separators 13 and the unit cells 15 alternately. FIG. 8 is a partial plan view of the fuel cell stack 100. A plurality of the inflow ports 43 and the inflow release ports 45 open alternately at the top surface of the fuel cell stack 100. As described later, air from the air manifold 54 and water sprayed from a plurality of nozzles 55 simultaneously flow into the introducing ports 43 and the inflow release ports 45. In this case, the sidewalls 47 function as cooling fins.

The air and the water that respectively flow via the introducing ports 43 and the inflow release ports 45 cool down the current collecting members 3, 4 in the cooling passage 41 by latent heat cooling.

Figure 9:
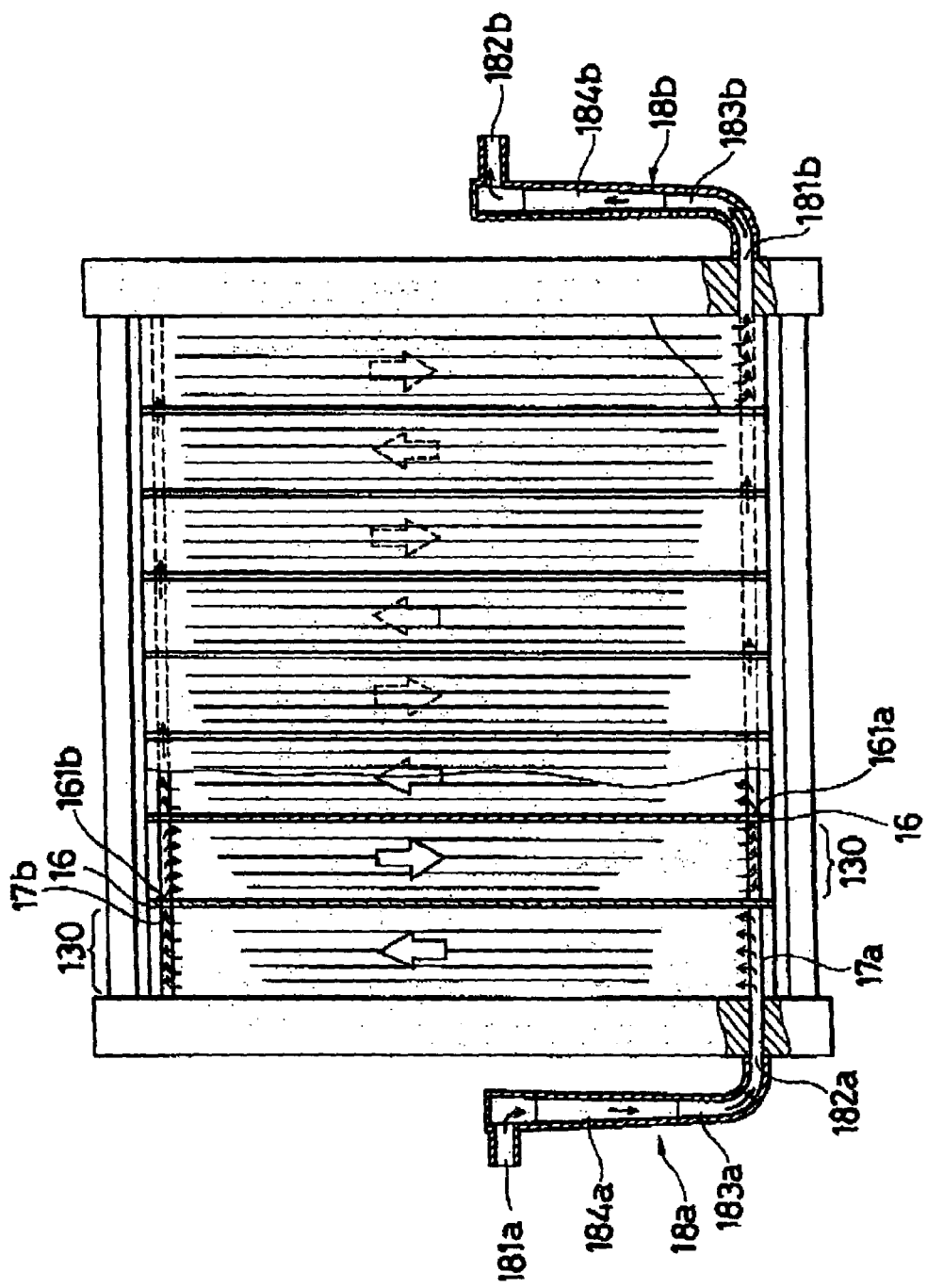
FIG. 9 is a whole plan view of the fuel cell stack.

FIG. 9 is a whole plan view of the fuel cell stack 100. Unit 130 is formed by stacking a predetermined number of the fuel cell separators 13 having the structure described above. The fuel cell stack 100 is constructed by stacking a plurality of units 130. A separator 14 lies between adjacent units 130, 130, and is constructed by putting a shield plate 16 between the current collecting members 3, 4. The shield plate 16 has an aperture 161a or 161b having a sectional shape the same as a hydrogen passage 17a or 17b in the position corresponding to that of either the hydrogen passage 17a or the hydrogen passage 17b. Since the shield plate 16 has electric conductivity, it does not prevent electric current from flowing in the fuel stack 100.

On the other hand, in the case where the shield plate 16 has the aperture 161a, the shield plate 16 prevents the hydrogen gas from flowing in the hydrogen passage 17b. Likewise, where the shield plate 16 has the aperture 161b, the shield plate 16 prevents the hydrogen gas from flowing in the hydrogen passage 17a. The shield plates 16 are alternately arranged so that the shield plate 16 having the aperture 161b, the shield plate 16 having the aperture 161a . . . are sequentially positioned from the hydrogen gas inflow side to the hydrogen gas outflow side. In this way, the supplied hydrogen gas flows into the fuel chamber 30 of every unit 130 by alternately shielding either the hydrogen passage 17a or 17b for every unit 130. More specifically, as shown in FIG. 9, the hydrogen gas flows from the hydrogen passage 17a toward the hydrogen passage 17b in the first unit 130, in the second unit 130 the gas flows from the hydrogen passage 17b toward the hydrogen passage 17a, and in the third unit 130 the gas flows from the hydrogen passage 17a toward the hydrogen passage 17b. Thus, the hydrogen gas flows in alternating directions.

Namely, the fuel cell stack 100 includes stacked units 130 in which the unit cells 15 and the separators 13 are stacked, and a pair of hydrogen passages 17a, 17b, which respectively communicate with fuel chambers 30, which extend in the direction of the stacking of separators 13 in the unit 130 and which are positioned at opposing ends of the fuel chambers 30. Further, between the abutting units 130, the fuel cell stack 100 includes communicating passages 161a (or 161b) for communicating between the hydrogen passages 17a, 17a (or 17b, 17b), and a blocking portion (the shield plate 16) for restricting the flow of the hydrogen gas between the other hydrogen passages 17b, 17b (or 17a, 17a). The communicating passages and the blocking portions are alternately arranged so that one of hydrogen passages 17a, 17a (or 17b, 17b) and the other hydrogen passages 17b, 17b (or 17a, 17a) alternately face in the direction of the direction of stacking of the stacked units 130. In this case, the hydrogen gas flows through the fuel chambers 30 of the units while its flow direction is repeatedly reversed.

In this way, since the fuel cell stack 100 is divided into the plurality of units 130, and receives the hydrogen gas flow in every unit 130, it is possible to prevent the hydrogen gas flow rate from differing for different units 130. Further, in each unit 130, it is also possible to prevent the hydrogen gas flow rate from differing as between the fuel chambers 30 by stacking the separators 13 and the unit cells 15. Furthermore, since the hydrogen gas supplied in the fuel cell stack 100 repeatedly flows through the unit 130, the hydrogen gas has many opportunities to come into contact with the fuel electrode of the fuel chamber 30, thereby improving the reaction efficiency between the hydrogen and oxygen gases. Since the total volume of the fuel chamber 30 belonging to one unit 130 is such as to accommodate a large amount of hydrogen gas, the hydrogen gas does not grow stagnant in the fuel chamber 30 and can exit the fuel chamber 30 and the fuel cell stack 100 in a short time. Thus, this rate of replacement shortens the time required to replace the substituted gas by the hydrogen, and shortens the time the substituted gas and the hydrogen are unevenly distributed, thus preventing deterioration of the electrodes. Further, increasing the flow rate of the hydrogen during normal power generation makes the discharge of generated water easy, and this makes it possible to prevent loss of power output due to a clogged drain of the fuel cell.

Figure 10:
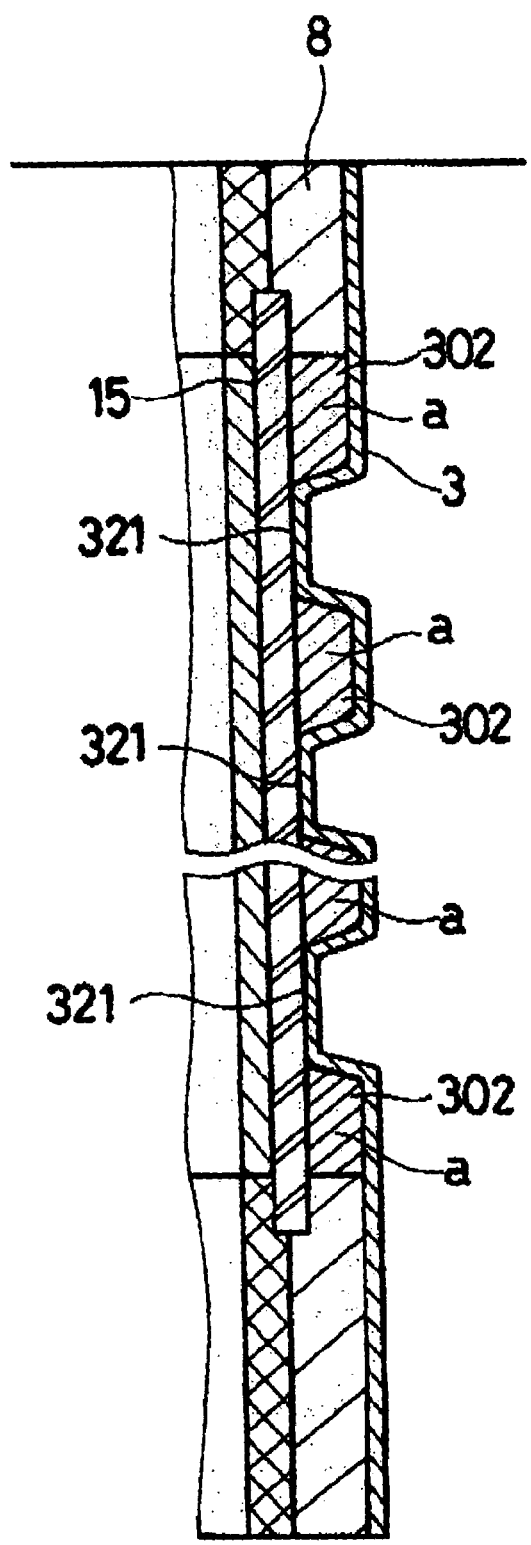
FIG. 10 is a partial cross-section side view of the fuel cell stack.
Figure 11:
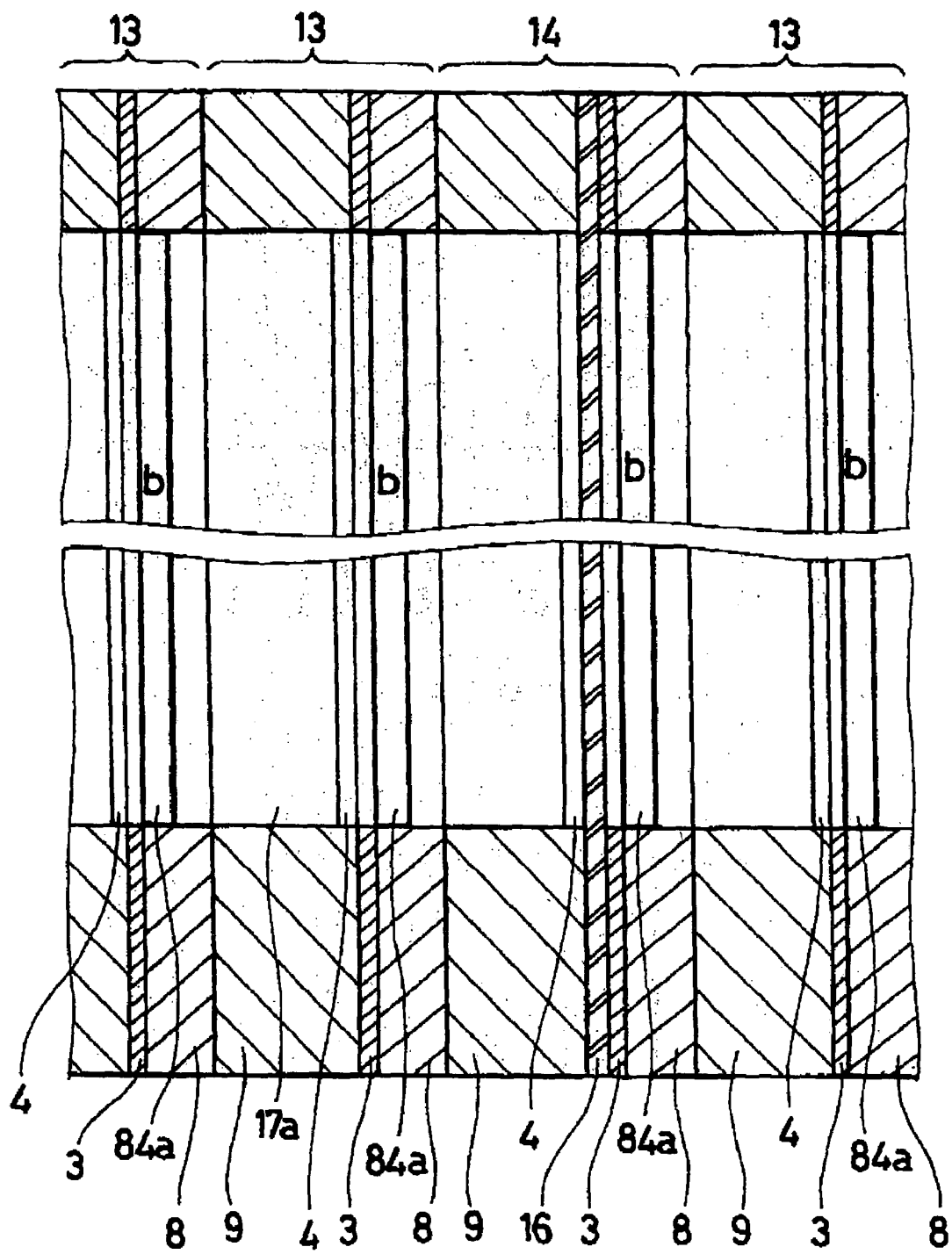
FIG. 11 is a partial cross-section, taken along line D-D in FIG. 3, of the fuel cell stack illustrating a vertical section of the hydrogen passage.

The number of the fuel cell separators 13 constituting the unit 130 is determined so that the cross-sectional area of the hydrogen passage 302 in each of the separators 13 is about the same as the cross-sectional area of the hydrogen passages 17a, 17b. The cross-sectional area of the hydrogen passage 302, i.e., the area of the surface perpendicular to the line of flow of the hydrogen gas through the fuel chamber 30 is minimized, namely, total area of "a" in FIG. 10 (the total cross-sectional area of the hydrogen passage 302 in the separator 13 constituting the unit 130), or the total cross-sectional area of the hydrogen flow passage 84 (namely, the area of "b" circled by the heavy line in FIG. 11). Because the cross-sectional area of the flow passage of hydrogen within the fuel cell stack 100 does not fluctuate widely while the gas flows in the fuel cell stack 100 (namely, from the inflow to the outflow), it is possible to distribute the gas evenly in the fuel chamber 30 of each of the separators 13 constituting the unit 130.

Therefore, the substituted gas (namely, air) within the fuel cell stack 100 can be displaced efficiently by the flow of fuel gas at the time of power generation start-up, thereby replacing the substituted gas by the hydrogen gas more evenly and rapidly.

Figure 12:
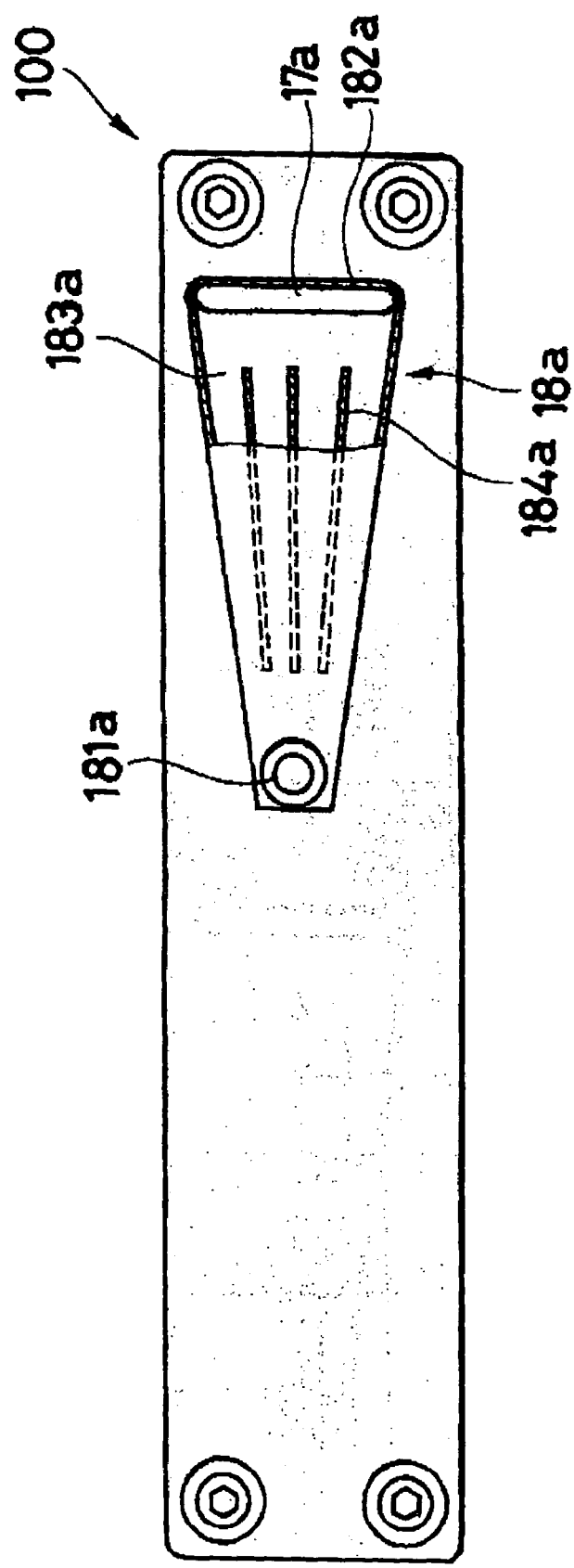
FIG. 12 is a front view of the fuel cell stack.

FIG. 12 is a front view of the fuel cell stack 100. An introduction guide passage 18a is provided for the hydrogen passage 17a as a current means. The introducing guide passage 18a includes a gas introducing port 181a having the same cross-sectional shape as hydrogen introducing passage 202 (see FIG. 1), and a gas discharging port 182a having the same cross-sectional shape as the hydrogen passage 17a. The width of passage 183a between the gas introducing port 181a and the gas discharging port 182a gradually increases, and guides the gas stream so that the distribution of the gas flow rate in the cross-section of the hydrogen passage 17a becomes uniform (even). Further, a plurality of current plates 184a are provided in the passage 183a for guiding the hydrogen gas while controlling the pressure loss of the gas stream.

Figure 13:
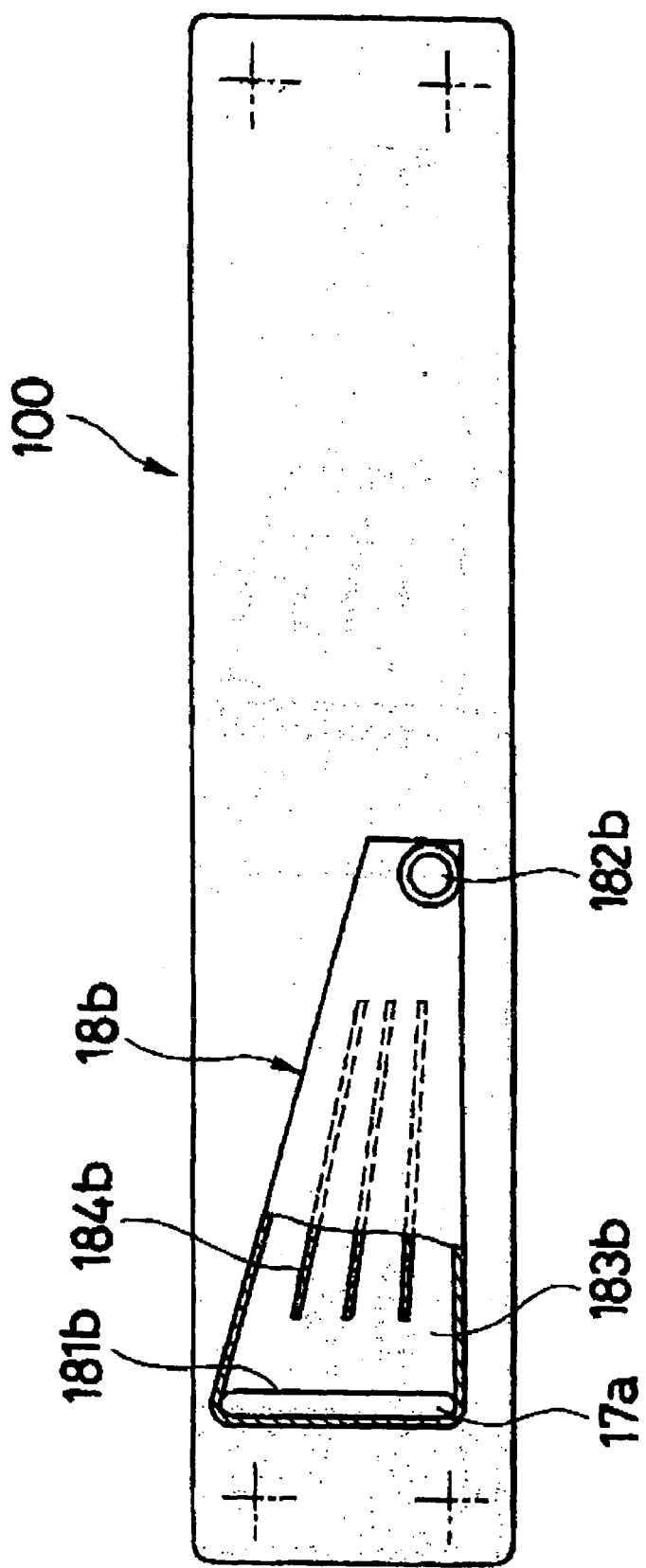
FIG. 13 is a rear view of the fuel cell stack.

FIG. 13 is a back view of the fuel cell stack 100. A discharge guide passage 18b is provided on the hydrogen gas outflow portion of the fuel cell stack 100. The discharge guide passage 18b includes a gas introducing port 181b having the same cross-sectional shape as the hydrogen passage 17a, and a gas discharging port 182b having the same cross-sectional shape as hydrogen outflow line 203 (see FIG. 1). The width of a passage 183b between the gas introducing port 181b and the gas discharging port 182b gradually decreases. Further, a plurality of current plates 184b are provided in the passage 183b, for guiding the hydrogen gas while controlling the pressure loss along the gas stream.

With the structure of the fuel cell stack 100 described above, the flow of hydrogen gas into the fuel cell stack 100 is protected from pressure loss, and is evenly (uniformly) supplied to the fuel chamber 30 of each of the fuel cell separators 13.

Next, other elements shown in FIG. 1 will be described. An air supply system 12 supplies atmospheric air to the air passage 40 and the cooling passage 41 via the opening 941 of the fuel cell stack 100, and discharges the air from the fuel cell stack 100 through a condenser 51. An air fan 122 is provided on an air supply line 123 as suction means, and supplies the air to the air manifold 54 from the ambient atmospheric air. The air flows into the air passage 40 of the fuel cell stack 100 from the air manifold 54 to supply oxygen to the oxygen electrode (namely, the current collecting member 3). The moisture in the air discharged from the fuel cell stack 100 is condensed and recovered in the condenser 51, and then the dry air is discharged. The temperature of the air discharged from the fuel cell stack 100 is monitored by a discharge-gas temperature sensor S1. Electrical-potential detection sensors S2 are provided on the fuel cell stack 100 to measure the local electrical potential of each of the unit cells 15 in the fuel cell stack 100.

In this embodiment, nozzles 55 are provided on the air manifold 54, and the water is sprayed from the nozzles 55 into the air in liquid state and mixed with the air. Most of the water is recovered, by a container (not shown in the drawings) provided on the lower side of the fuel cell stack 100, while remaining in the liquid state.

The fuel gas supply system 10 supplies the hydrogen gas released from the high-pressured hydrogen tanks 11 to the hydrogen passage 17a of the fuel cell stack 10 via the hydrogen line 201 and the hydrogen inflow line 202. The hydrogen line 201 is provided with a hydrogen primary pressure sensor S3, a hydrogen primary pressure regulating valve 21, a hydrogen base electromagnetic valve 22, a hydrogen secondary pressure regulatable-pressure valve 23, a hydrogen supply electromagnetic valve 24, and a hydrogen secondary pressure sensor S4, in this order from the high-pressure hydrogen tanks 11 side toward the fuel cell stack 100. The hydrogen pressure within the high-pressure hydrogen tanks 11 is monitored by the hydrogen primary pressure sensor S3. In this case, the hydrogen secondary pressure regulation valve 23 and a control section 75 for controlling the hydrogen secondary pressure (i.e., controlling the set value of the pressure regulating valve 23) constitute pressure regulating means for regulating supply pressure of the fuel gas (hydrogen gas) supplied to the fuel chamber 30.

The hydrogen flow is regulated to a pressure adapted for supply to the fuel cell stack 100 by the hydrogen primary pressure regulating valve 21. The supply of the hydrogen to the fuel cell stack 100 is electrically controlled by opening/closing of the hydrogen base electromagnetic valve 22. Thus, flow of the hydrogen gas may be cut off by closing the electromagnetic valve 22. Further, the hydrogen gas pressure just before entry to the fuel cell stack 100 is monitored by the hydrogen secondary pressure sensor S4.

One end of the hydrogen inflow line 202 is connected to the hydrogen line 201, while the other end is connected to the hydrogen passage 17a of the fuel cell stack 100.

In the fuel cell stack 100, as shown in FIG. 3, the hydrogen gas flows from the hydrogen passage 17a to the hydrogen flow passage 84a, and then flows from the hydrogen flow passage 84a to the hydrogen passages 301, 302. The hydrogen gas is supplied to the fuel electrode within the hydrogen passages 301, 302, and then the remaining hydrogen gas exits the hydrogen flow passage 84b to the hydrogen passage 17b.

The hydrogen gas is discharged from the hydrogen passage 17b of the fuel cell stack 100 to the hydrogen outflow line 203 of the fuel gas supply system 10. An oxygen concentration sensor S5, a hydrogen concentration sensor S6 and a hydrogen pump 25 are provided on the hydrogen outflow line 203. The hydrogen pump 25 introduces the hydrogen gas discharged from the fuel cell stack 100 through the check valves 26, 29 into, respectively, a hydrogen discharge line 204 and a hydrogen return line 205, both of which are connected to the downstream side of the hydrogen pump 25. The other end of the hydrogen return line 205 is connected to the hydrogen inflow line 202, whereby a hydrogen loop is formed by the hydrogen inflow line 202, the hydrogen outflow line 203 and the hydrogen return line 205. The check valve 29 is provided in the hydrogen return line 205 and, therefore, the hydrogen gas supplied from the high-pressure hydrogen tanks 11 cannot be discharged directly to the hydrogen discharge line. The check valve 26, a hydrogen discharge electromagnetic valve 27a, and a silencer 28a are provided on the hydrogen discharge line 204 in this order.

The oxygen concentration sensor S5 detects the oxygen concentration of the gas discharged from the fuel cell stack 100, while the hydrogen concentration sensor S6 detects the hydrogen concentration of the gas discharged from the fuel cell stack 100.

In the water supply system 50, water from a water tank 53 is pressure-fed to the nozzles 55 provided on the air manifold 54 through a water supply line 56 by a water supply pump 61, and then the supplied water is sprayed from the nozzles 55 into the air manifold 54 continuously or intermittently. This water enters the air passage 40 and the cooling passage 41 via the opening 941 of the fuel cell stack 100. Since the latent heat is preferentially drawn from this introduced water, the moisture in the solid polymer electrolyte membrane 15a of the oxygen electrode 15b side is prevented from evaporating. Therefore, the electrolyte membrane 15a of the oxygen electrode 15b side can be constantly maintained in an evenly wet condition by the generated water without drying out. Further, the heat of the oxygen electrode 15b itself is removed by the water supplied to the surface of the oxygen electrode 15b and the water flowing into the cooling passage 41. In this manner, the temperature in the fuel cell stack 100 is controlled.

With the structure described above, it is possible to cool down the fuel cell stack 100 adequately without an additional cooling water. It is possible to maintain the temperature of the fuel cell stack 100 around a desired temperature by controlling the output of the water supply pump 61 responsive to the temperature of the discharged air detected by the discharge-gas temperature sensor S1.

The water in the water tank 53 is supplied to the surface of the oxygen electrode 15b from the nozzles 55 provided on the air manifold 54, and then the supplied water is recovered by the condenser 51 and returned to the water tank 53 by a water collection pump 62. A check valve 52 is provided between the water collection pump 62 and the water tank 53 to prevent the water in the water tank 53 from flowing back through the water collection pump 62. The water level in the water tank 53 is detected by the water level sensor S7.

Further, the fuel cell system 1 includes a start switch, namely, an ignition key for starting up and stopping the system 1 (not shown in the drawings). The fuel cell system 1 is connected to an external load (not shown in the drawings) in its normal power generating state.

In normal operation in which the fuel cell system 1 outputs electric power, air is supplied from the air fan 122 to the fuel cell stack 100, and simultaneously hydrogen gas is supplied from the fuel supply system 10 to the fuel cell stack 100. The redox reaction which generates power is continued in the fuel cell stack 100, and this reaction also generates water. The reaction is maintained by supply of air and hydrogen to the oxygen electrode 15b and the fuel electrode 15c, respectively. The necessary concentration of hydrogen gas, at which the redox reaction can be efficiently generated in the unit cell 15, is supplied to the fuel cell stack 100, and the supply pressure in normal operation is set within a range in which the required reaction can be maintained and waste of the hydrogen gas can be eliminated. If the supply pressure in normal operation is higher than necessary, a glut results in the discharge of most of the non-reacted hydrogen gas, therefore wasting fuel (i.e., the wasting of the hydrogen gas). Based on this consideration, the supply gas pressure of the hydrogen gas in normal operation is set at 0.1 MPa, for example. On the other hand, to provide for discharge of the substituted gas and prevention of uneven distribution of the gases, the supply pressure of the hydrogen gas at start-up of power generation is set at a pressure (for example, 0.2 MPa) higher than the gas pressure in normal operation, and the supply of the hydrogen gas at the higher pressure is set for a very short time.

In this embodiment of the present invention, "normal operation" (normal power generation) includes "the time when the fuel cell system 1 is connected to the external load," that is, a state where the fuel cell system 1 is generating electrical power, and "a power generation start-up time" which is a period of time from when the fuel cell system 1 is started with the ignition key to the time when the fuel cell system 1 is connected to the external load. Further, "the start-up time" also includes the time for the start switch to be turned on after a lapse of a predetermined period of time after the start switch has been turned off in normal power generation and "normal operation" (normal power generation) also includes the time when the fuel cell system 1 is being connected to the external load after lapse of the predetermined period of time.

Each element of the fuel cell system 1 described above is controlled by a control section 75. The values detected by the sensors S1-S7 are supplied to the control section 75. More specifically, the control section 75 controls the amount of water supplied by the water supply pump 61, on/off operation of the water collection pump 62, on/off operation of the air fan 122, and on/off operation of the hydrogen pump 25. Further, the control section 75 also controls the opening/closing operation of the hydrogen base electromagnetic valve 22, opening/closing operation of the hydrogen supply electromagnetic valve 24, opening/closing operation of the hydrogen discharge electromagnetic valve 27a, and the setting of pressure by means of the hydrogen secondary-pressure regulating valve 23. The control section 75 may also include a timer for measuring a predetermined time, or the control section may be connected to a timer 76. The timer measures a period of time after the ignition key (start switch) has been turned off during normal power generation. In this regard, "power generation start-up time" means a predetermined period of time in the case where the start switch is turned on after a lapse of a given period of time (for example, six hours) after the start switch has been turned off in normal power generation. In other words, before the lapse of this predetermined period of time, the start-up operation of the present invention (to be described later) is prohibited.

Figure 14:
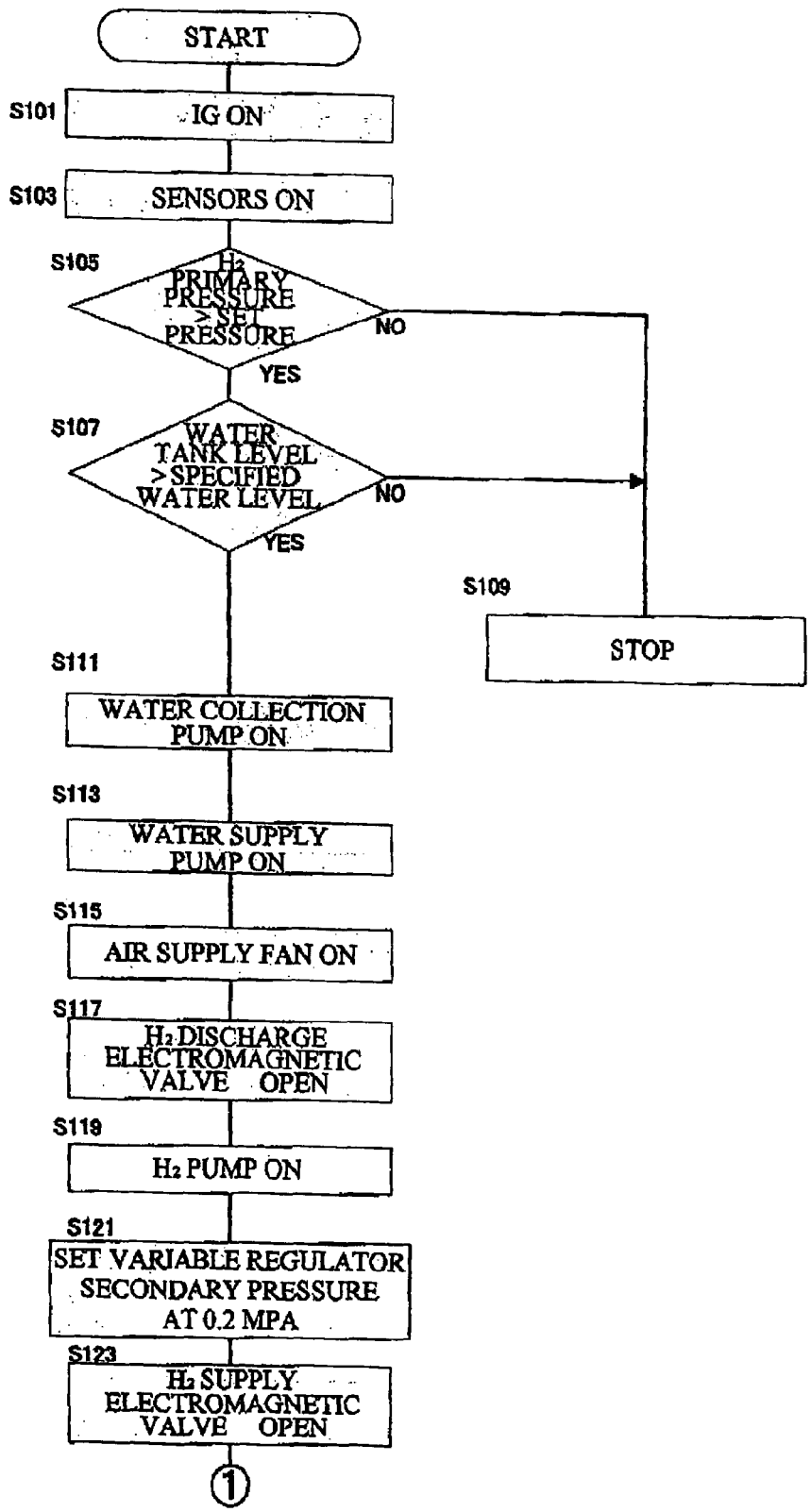
FIG. 14 is a flowchart of a control routine for the start-up of the fuel cell system in a first embodiment according to the present invention.

The start-up procedure for fuel cell system 1 having the structure described above is as illustrated in FIGS. 14 and 15 which are a flowchart of a start-up control routine for the fuel supply system 10 at the time of start-up of the fuel cell system 1 in a first embodiment of the present invention.

When a start-up operation, such as the ignition key is turned ON or the like, is confirmed (Step S101), all of the sensors of the fuel cell system 1 are switched (turned) ON (Step S103). The turning ON of the sensors allows detection values for the whole system to be obtained. It is then judged whether or not the hydrogen primary pressure is more than a predetermined set value based on the signal from the hydrogen primary pressure sensor S3 (Step S105). This predetermined set value may be set at 1 MPa, for example. In the case where the primary pressure is less than the set value, the start-up operation is suspended (stopped) (Step S109) because it indicates an insufficient amount of hydrogen in the high-pressure hydrogen tanks 11. On the other hand, in the case where it is judged that the primary pressure is more than the set value, it is judged whether or not water level in the water tank 53 is higher than a predetermined level, based on the signal supplied from the water level sensor S7 (Step S107). In the case where it is judged that the water level is less than the predetermined level, the start-up operation is suspended (Step S109) because it is impossible to cool down the fuel cell stack 100 adequately.

In the case where it is judged that the level in the water tank 53 is higher than the predetermined level, the water collection pump 62 is switched ON to start to collect water (Step S111). Further, the water supply pump 61 is switched ON to spray water from the nozzles 55 of the air manifold 54 into the fuel cell stack 100 (Step S113). At the same time, the hydrogen base electromagnetic valve is opened. Next, the air supply fan 122 is driven (switched ON) to supply air into the fuel cell stack 100. In this manner, air and water flows are started, respectively, to the oxygen electrode 15b in the fuel cell stack 100.

Next, in order to supply hydrogen gas to the fuel cell stack 100, a discharge of the residual oxygen gas (i.e., air) from the fuel chamber of the fuel cell stack 100 is started. The hydrogen discharge electromagnetic valve 27a is opened (Step S117), and the hydrogen pump 25 is switched ON (Step S119). Thus, a suction pressure to suck the hydrogen gas from the fuel chamber 30 of the fuel cell stack 100 is generated, thereby producing a negative pressure inside of the fuel chamber 30.

Next, the pressure output of the hydrogen secondary pressure regulating valve 23 is set (established) at 0.2 MPa (Step 121), and the hydrogen supply electromagnetic valve 24 is opened (Step S123). Thus, hydrogen gas at a pressure of 0.2 MPa is supplied into the fuel chamber 30 which is at a negative pressure. At the same time, the residual gas remaining in the fuel chamber 30 before start-up is purged from the fuel chamber 30 by the supply of hydrogen gas, and suction of the hydrogen pump 25. This state is maintained for 0.5 seconds (Step S125), and after 0.5 seconds has elapsed, it is judged whether or not the hydrogen concentration of the gas discharged from the fuel cell stack 100 is more than 95 volume percent (vol. %) based on the signal from the hydrogen concentration sensor S6. In the case where the hydrogen concentration does not reach 95 volume percent within 0.5 seconds, an alarm (not shown in the drawings) is switched ON because there is the possibility of damage to the electrodes, and then the start-up routine proceeds to Step S135. On the other hand, in the case where the hydrogen concentration is more than 95 volume percent, it is assumed that the fuel chamber 30 is permeated with the hydrogen gas without uneven distribution of gases, and that there is insufficient oxygen in the fuel chamber 30 to produce local electric current.

Next, it is judged whether or not the oxygen concentration of the discharged gas is less than 1 volume percent based on the signal from the oxygen concentration sensor S5 (Step S129). In the case where it is judged that the oxygen concentration is more than 1 volume percent, the alarm is switched ON (Step S133), and then the routine proceeds to Step S135. On the other hand, in the case where the oxygen concentration is less than 1 volume percent, it is assumed that hardly any oxygen gas remains in the fuel chamber 30, and that there is insufficient gas in the fuel chamber 30 to produce local electric current.

In the case where it is judged that the oxygen concentration is less than 1 volume percent, it is then judged whether or not the local electrical potential of each electrode in the unit cells 15 is less than 1.1 Volts (V) based on the signals from the electrical-potential detection sensors S2 (Step S131). In the case where there is an electrode having more than 1.1 V, the alarm is switched ON (Step S133), and then the routine proceeds to Step S135. Since it is difficult to determine the extent of unevenness of gas distribution in each of the fuel chambers 30 merely by detecting the hydrogen concentration and the oxygen concentration of the discharged gas, provision is also made for judging the possibility of uneven gas distribution by detecting the local electrical potential of each electrode in the unit cells 15.

In the case where it is judged that all of the local potentials are less than 1.1 V in Step S131, it is assumed that the oxygen gas (air) in each of the fuel chambers 30 is substantially evenly substituted with the hydrogen gas. Therefore, the set pressure of the hydrogen secondary pressure regulating valve 23 is set at 0.1 MPa (Step S135), and the hydrogen discharge electromagnetic valve 27a is closed (Step S137). Then, the start-up routine is terminated and the system proceeds according to a normal operation (power generation) routine (not shown).

Figure 16:
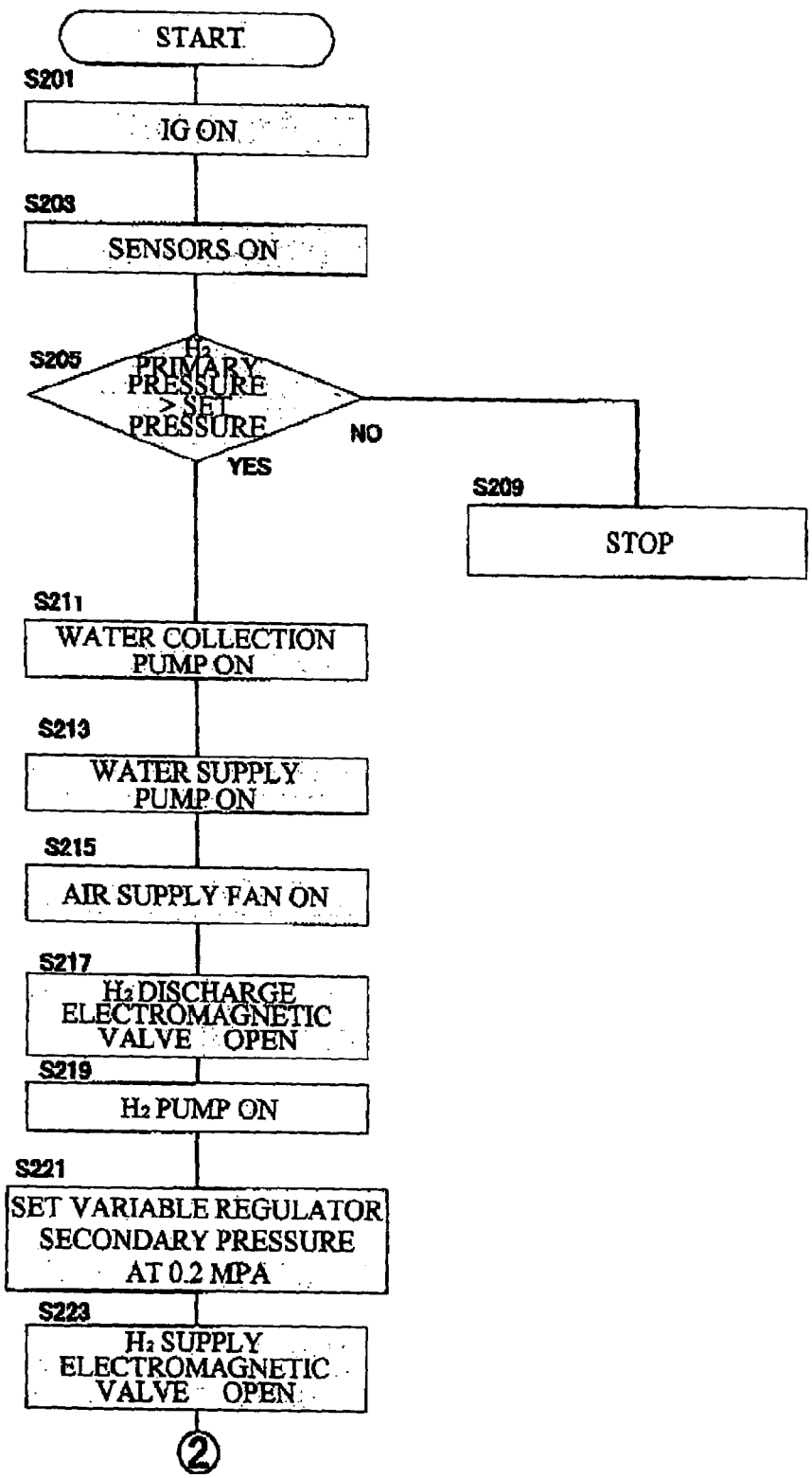
FIG. 16 is a flowchart of a control routine for start-up of the fuel cell system in a second embodiment according to the present invention.
Figure 17:
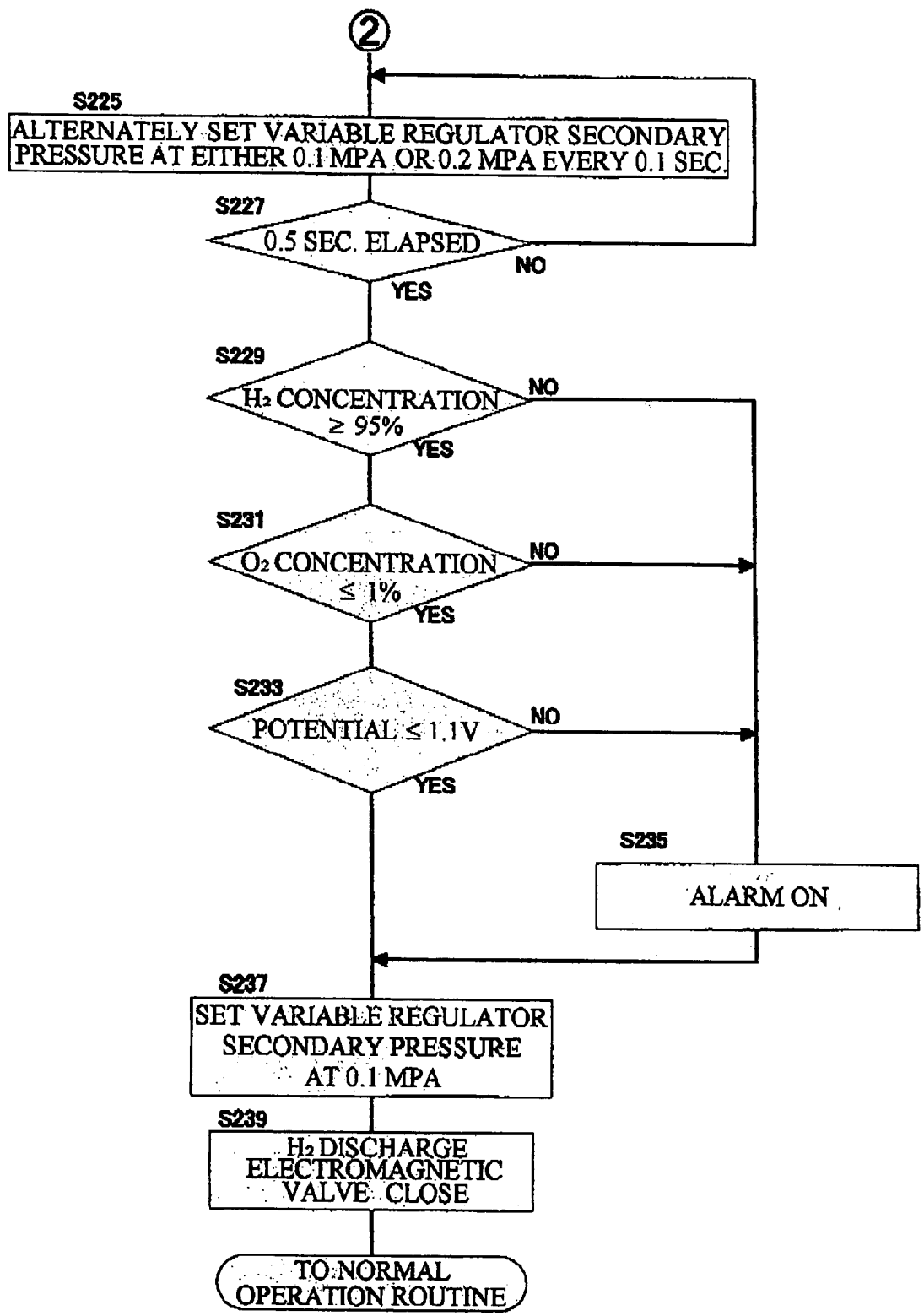
FIG. 17 is a continuation of the flowchart of FIG. 16.

FIGS. 16 and 17 together constitute a flowchart illustrating a start-up control routine according to a second embodiment of the present invention. Since the operations at Steps S201-S223 are same as those at Steps S101-S123 of the first embodiment shown in FIG. 14, a description of these steps is omitted.

After the hydrogen supply electromagnetic valve 24 is opened (Step S223), the hydrogen secondary regulating valve 23 is set to alternate pressure between 0.1 MPa and 0.2 MPa every 0.1 seconds (Step S225). Thus, the set pressure is repeatedly changed between 0.1 MPa and 0.2 MPa at intervals of 0.1 seconds. The hydrogen gas pressure supplied to the fuel cell stack 100 pulses in short periods due to this change of setting.

Since a change in hydrogen gas flow in the fuel chamber 30 and other passages results from this pulsation, stagnation in the fuel chamber 30 and other passages and occurrence of areas where the hydrogen gas flow rate is relatively slow are prevented, and replacement (substitution) of residual gas by hydrogen gas is carried out evenly and quickly.

Figure 15:
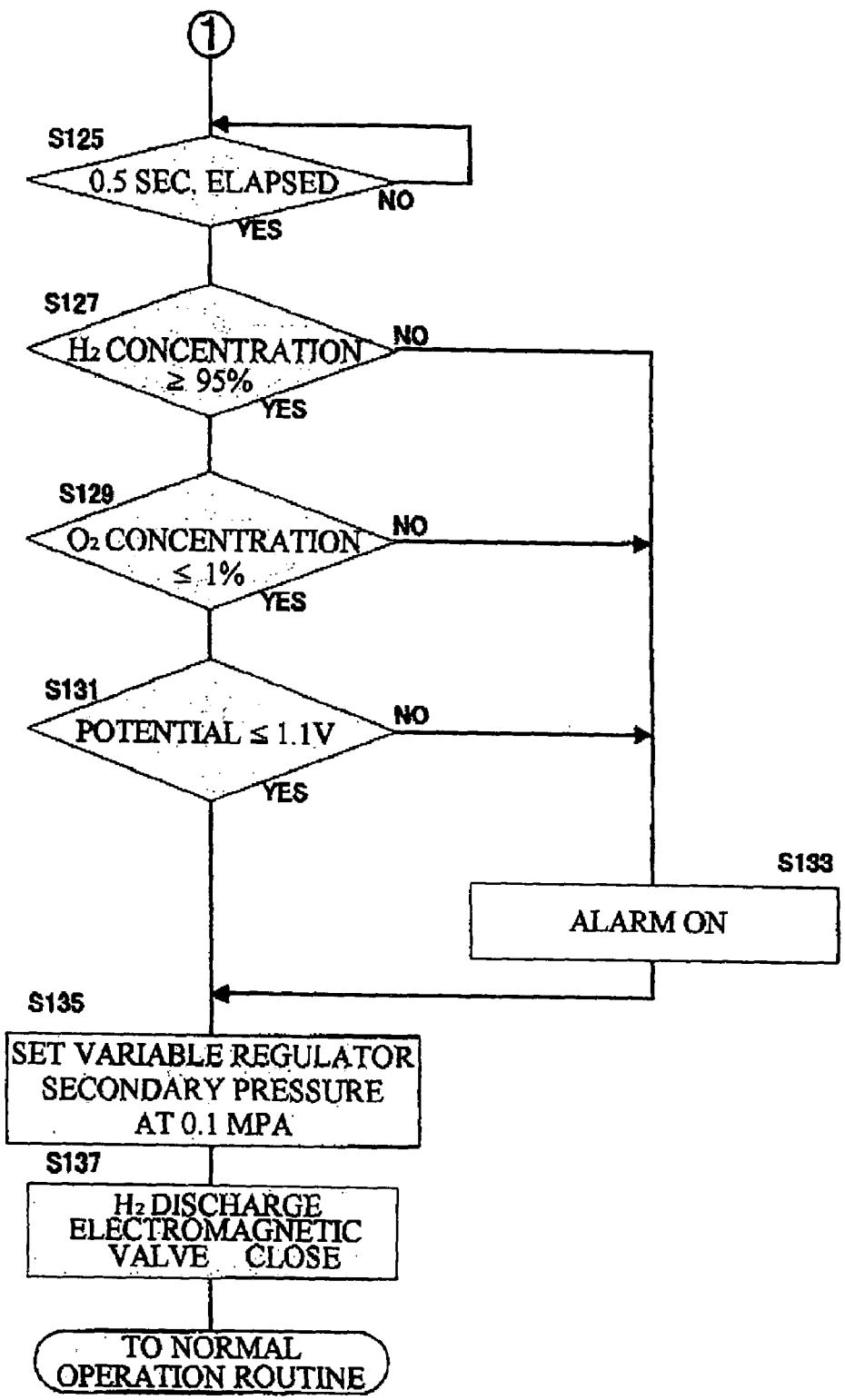
FIG. 15 is a continuation of the flowchart of the control routine of FIG. 14.

Since the operations following Step S225, namely, Steps S227-S239 are same as Steps S125-S137 of the first embodiment shown in FIG. 15, a description of these steps is omitted.

Figure 18:
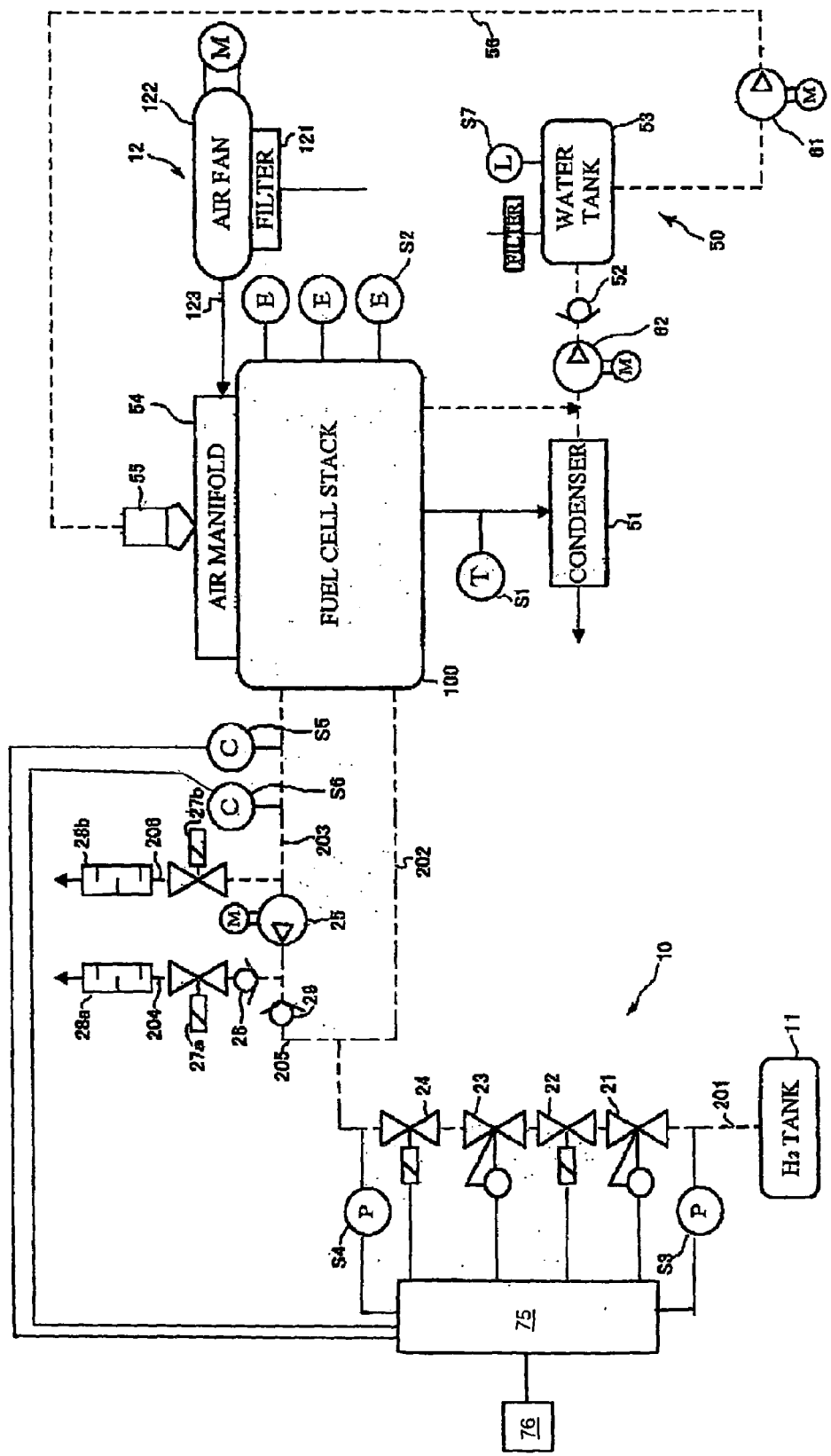
FIG. 18 is block diagram illustrating the fuel cell system of a third embodiment according to the present invention.

Next, a fuel cell system in accordance with a third embodiment will be described with reference to FIG. 18. The fuel cell system of the third embodiment, as compared with the fuel cell system of the first embodiment, further includes a start-up hydrogen discharge line 206 on the upstream side of the hydrogen pump 25 on the hydrogen outflow line 203.

On the start-up hydrogen discharge line 206, a hydrogen discharge electromagnetic valve 27b and a silencer 28b are provided in this order. The opening/closing operation of the hydrogen discharge electromagnetic valve 27b is controlled by a control section 75 as in the first embodiment described above.

Since other elements of the system of the third embodiment are same as those of the first embodiment, a description of these structures is omitted. The start-up operation of the second embodiment is described with reference to FIGS. 14 and 15. In this embodiment, the start-up hydrogen discharge electromagnetic valve 27b is open after Step S115 of the first embodiment, and then Steps S121-S137 are carried out. In this third embodiment, since the cross-sectional area of the start-up hydrogen discharge line 206 is greater than that of the hydrogen outflow line 203, there is hardly any pressure loss in the start-up hydrogen discharge line 206 at the time of hydrogen discharge.

Figure 19:
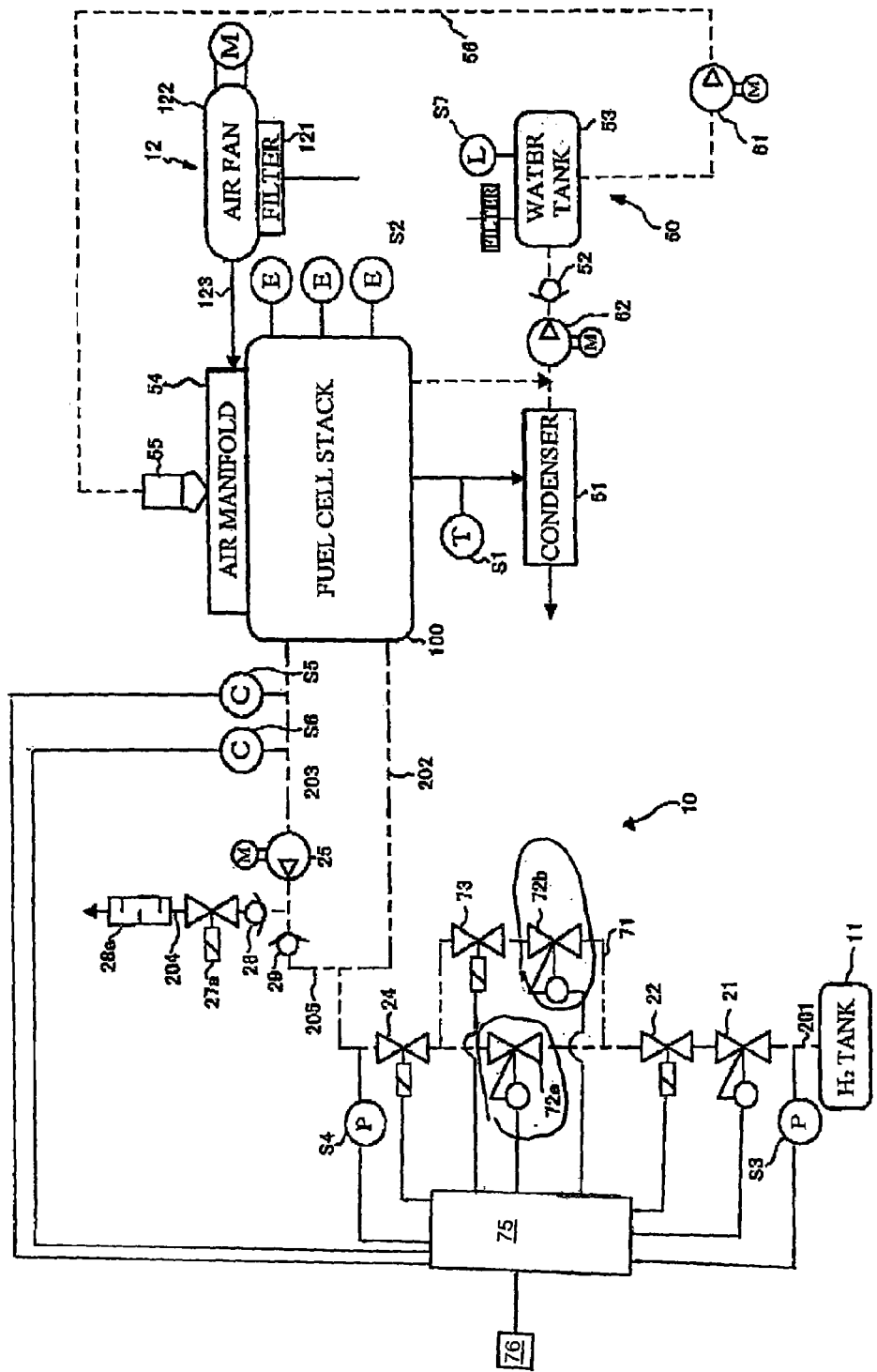
FIG. 19 is block diagram illustrating the fuel cell system of fourth and fifth embodiments according to the present invention.

Fuel cell systems of the fourth and fifth embodiments are shown in FIG. 19. In addition to the elements of the fuel cell system 1 of the first embodiment, the fuel cell system of the fourth and fifth embodiments includes a hydrogen secondary pressure regulating valve 72a in place of the hydrogen secondary pressure regulating pressure valve 23. The system of the fourth and fifth embodiments further includes a start-up hydrogen secondary pressure regulating valve 72b and a start-up hydrogen supply electromagnetic valve 73 in a line 71 in parallel with pressure regulating valve 72a. The ends of the line 71 are respectively connected to the upstream and downstream sides of the hydrogen secondary pressure regulating valve 72a. The set values for the hydrogen secondary pressure regulating valve 72a and the start-up hydrogen secondary pressure regulating valve 72b are constant at 0.1 MPa and 0.2 Mpa, respectively. The pressure set for the hydrogen secondary pressure regulating valve 72a is a hydrogen supply pressure for normal operation, while the pressure set for the start-up hydrogen secondary pressure regulating valve 72b is higher than that set for normal operation. The control section (not shown in the drawings) controls opening/closing of the start-up hydrogen supply electromagnetic valve 73. Since other elements of the system in the fourth and fifth embodiments are same as those of the system 1 in the first embodiment, a description of these structures is omitted.

The hydrogen secondary pressure regulating valve 72a, the start-up hydrogen secondary pressure regulating valve 72b, and the start-up hydrogen supply electromagnetic valve (switching valve) 73 constitute the pressure regulating means in these embodiments. The control section, serving as a switching means, also controls the pressure regulating means in these embodiments.

Figure 20:
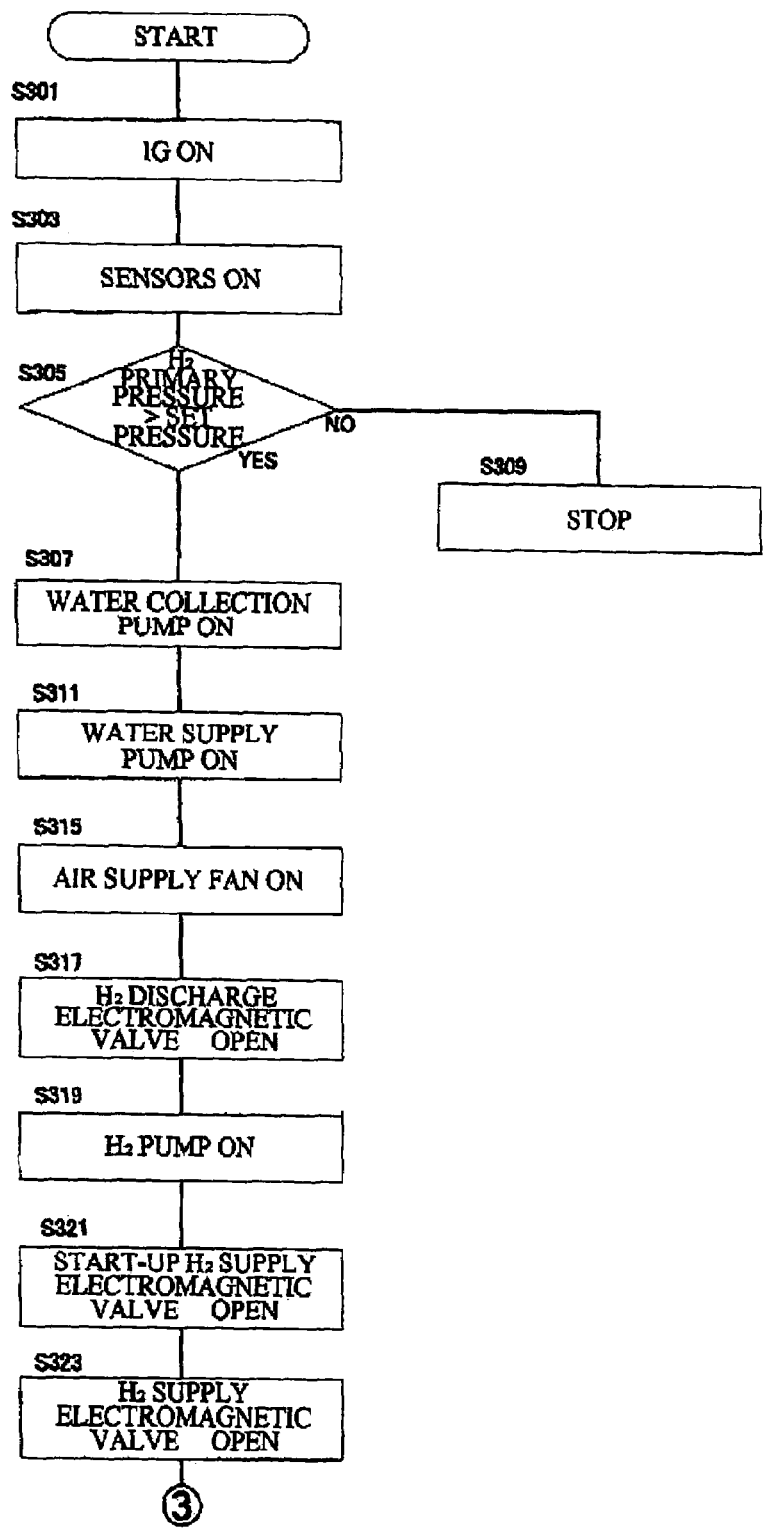
FIG. 20 is a flowchart of a control routine for start-up of the fuel cell system in a fourth embodiment according to the present invention.
Figure 21:
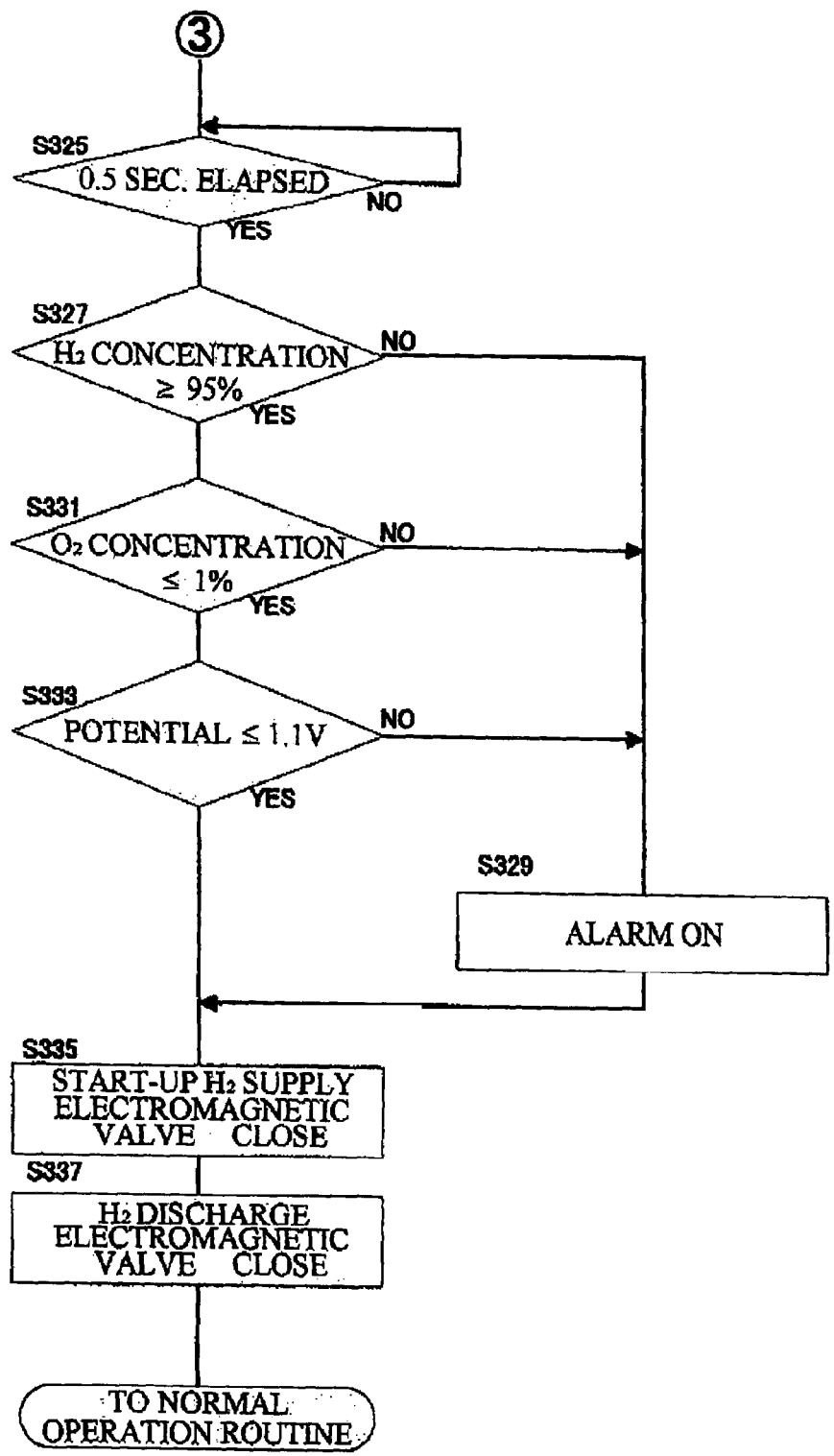
FIG. 21 is a continuation of the flowchart of the control routine of FIG. 20.

FIGS. 20 and 21 constitute a flowchart illustrating the control routine for start-up of the fuel cell system in the fourth embodiment. Since the operations of Steps S301-S319 are same as those of Steps S101-S119 of the first embodiment shown in FIG. 14, a description of these steps is omitted. After the hydrogen pump 25 is switched ON (Step S319), the start-up hydrogen supply electromagnetic valve 73 is opened (Step S321), and the hydrogen supply electromagnetic valve 24 is opened (Step S323). Thus, high-pressure hydrogen gas is supplied from the hydrogen tanks 11 to the fuel cell stack 100 through the start-up hydrogen secondary pressure regulating valve 72b having the high set value. At this time, the hydrogen secondary pressure becomes 0.2 MPa. Since the operations following Step S323, namely, the operations of Steps S325-S333 are same as those at Steps S125-S133 of the first embodiment shown in FIG. 15, a description of these steps is omitted.

In the case where the hydrogen concentration is more than 95 volume percent, the oxygen concentration is less than 1 volume percent, and all of the local electrical potentials are less than 1.1 V, the start-up hydrogen supply electromagnetic valve 73 is closed (Step S335). Thus, the supply of the hydrogen gas to the start-up hydrogen supply electromagnetic valve 73 is stopped, while the supply of the hydrogen gas is started to the hydrogen secondary pressure regulating valve 72a, which is set at the secondary pressure when the fuel cell stack 100 is in its normal power generation state.

Then, the hydrogen discharge electromagnetic valve 27a is closed (Step S337), and this start-up routine is terminated and the system proceeds to a normal operation (power generation) routine not shown in the drawings.

Figure 22:
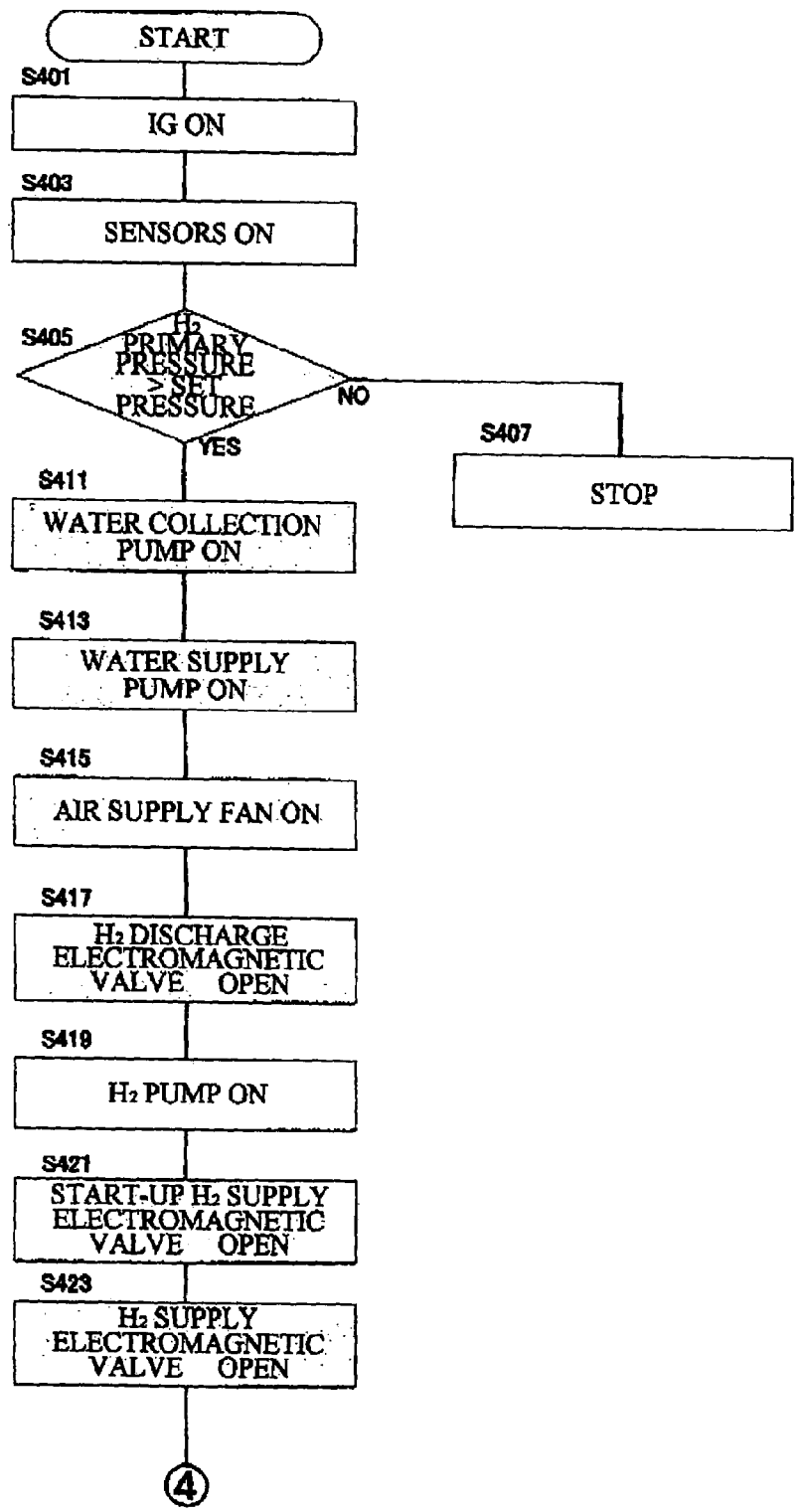
FIG. 22 is a flowchart of a control routine for start-up of the fuel cell system in a fifth embodiment according to the present invention.
Figure 23:
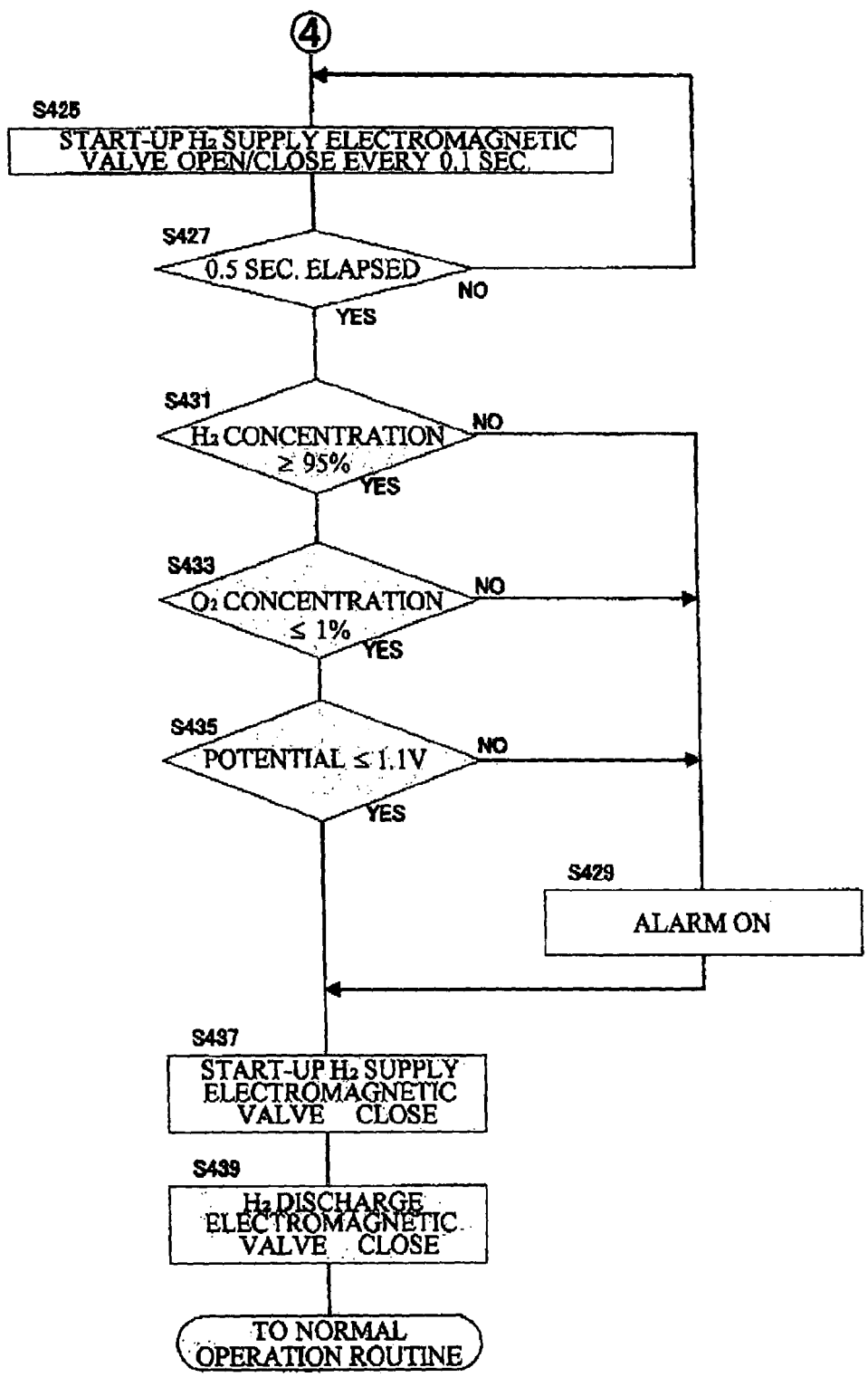
FIG. 23 is a continuation of the flowchart of the control routine of FIG. 22.

FIGS. 22 and 23 constitute a flowchart for a start-up control routine of the fuel cell system in the fifth embodiment. Since the operations of Steps S401-S419 are same as those of Steps S101-S119 of the first embodiment shown in FIG. 14, a description of these steps is omitted. After the hydrogen pump is switched ON (Step S419), the start-up hydrogen supply electromagnetic valve 73 is opened (Step S421), and the hydrogen supply electromagnetic valve 24 is opened (Step S423).

After the hydrogen supply electromagnetic valve 24 is opened (Step S423), the start-up hydrogen electromagnetic valve 73 is repeatedly switched between open/closed every 0.1 seconds (Step S425). When the start-up hydrogen electromagnetic valve 73 is opened, hydrogen gas is supplied to the fuel cell stack 100 through the start-up hydrogen secondary pressure regulating valve 72b, which is set at the high-pressure side, whereby the hydrogen secondary pressure becomes 0.2 MPa. On the other hand, when start-up hydrogen electromagnetic valve 73 is closed, the hydrogen gas is supplied to the fuel cell stack 100 through the hydrogen secondary pressure regulating valve 72a, which is set at the low-pressure side, whereby the hydrogen secondary pressure becomes 0.1 MPa. In this way, due to this pulsation of the hydrogen pressure, stagnation in the fuel chamber 30 and other passages or occurrence of areas where the hydrogen gas flow rate is relatively slow are prevented, and the replacement (substitution) of residual gas by hydrogen gas is carried out more evenly and quickly.

Since the operations following Step S425, namely, the operations of Steps S427-S439 are same as those of Steps S325-S337 of the fourth embodiment shown in FIG. 21, a description of these steps is omitted.

As mentioned above, in the present invention, the high-pressure hydrogen gas having a predetermined pressure higher than the pressure utilized in normal power generation is supplied to the fuel chamber 30 at the time of starting generation when there is the substituted gas in the fuel chamber 30, whereby the high-pressure hydrogen gas purges the substituted gas from the fuel chamber 30. Therefore, since the atmosphere within the fuel chamber 30 changes from a state of stagnation to a state of flow, uneven distribution of the substituted gas and the hydrogen gas is prevented. Further, since the hydrogen gas having the pressure higher than the pressure in normal power generation is supplied to the fuel chamber 30 to complete the replacement of the substituted gas by the hydrogen gas, the uneven distribution between the substituted gas and the hydrogen gas hardly occurs and there is no opportunity for the redox reaction between these gases. Therefore, the occurrence of localized electric current is prevented. In this regard, the completion of replacement of the substituted gas by the hydrogen gas within 0.7 seconds, preferably within 0.5 seconds, prevents the occurrence of local electric currents due to uneven gas distribution. Further, by shortening the supply time as mentioned above, it is possible to reduce waste of the hydrogen gas.

Further, by alternately changing the supply pressure of the hydrogen gas as in the second and fifth embodiments, a change of the gas stream in the fuel chamber 30 occurs, and this change prevents gas stagnation. Therefore, in these embodiments, uneven distribution of the gas can hardly occur in the fuel chamber 30.

In the present invention, the routine for start-up includes, after the step in which the ignition key is turned on, a step in which it is judged whether or not the ignition key (start switch) is turned on after the lapse of a predetermined period of time, and the routine is executed in the case where the ignition key is turned on after the lapse of a predetermined period of time after the ignition key has been turned off during normal power generation.

It should be noted that, even though the fuel cell system of the present invention has been described with reference to the preferred embodiments shown in the drawings, the present invention is not limited to these embodiments, and it is possible to make various modifications to each element of the fuel cell system, and various elements described above can be replaced with any other element capable of performing the same or a similar function.

What is claimed is:

1. A fuel cell system comprising:
    at least one fuel cell having a fuel chamber including a fuel electrode, an oxygen chamber including an oxygen electrode and an electrolyte layer interposed between the fuel electrode and the oxygen electrode;
    a fuel gas discharge line for discharging residual air from the fuel chamber;
    a hydrogen concentration sensor for detecting hydrogen concentration in gas exiting the fuel chamber, the hydrogen concentration sensor being provided on the fuel gas discharge line apart from the fuel cell;
    a discharge valve provided on the fuel gas discharge line; and
    pressure regulating means for regulating a supply pressure of a flow of the fuel gas supplied to the fuel chamber at a first pressure, higher than a second pressure used in normal power generation, during a start-up power generating state when the fuel cell starts up power generation with opening of the discharge valve, until the detected hydrogen concentration of the fuel gas in the fuel chamber which is detected by the hydrogen concentration sensor exceeds a predetermined hydrogen concentration, and for reducing the supply pressure of the flow of the fuel gas to the fuel chamber to the second pressure, lower than the first pressure, and closing the discharge valve when the detected hydrogen concentration of the fuel gas in the fuel chamber exceeds the predetermined hydrogen concentration, to thereby establish a normal power generating state in which a flow of fuel gas into the fuel chamber is maintained at the second pressure for generating electric power.

2. The fuel cell system according to claim 1, wherein the pressure regulating means includes a pressure regulating valve in the fuel gas supply line and control means for controlling the pressure regulating valve responsive to the detected hydrogen concentration of the fuel gas in the fuel chamber.

3. The fuel cell system according to claim 1, wherein the pressure regulating means includes two regulating valves that are arranged in parallel and are respectively set to provide a flow of fuel gas at different supply pressures, a switching valve arranged on the line, and switching means for switching the open and close of the switching valve.

4. The fuel cell system according to claim 1, wherein, in the normal power generation state of the fuel cell, the fuel cell is connected to an external load.

5. The fuel cell system according to claim 1, further comprising a start switch for turning on and off of the fuel cell system wherein the power generation start-up time of the fuel cell includes a predetermined period of time after the start switch is turned on.

6. The fuel cell system according to claim 5, wherein the power generation start-up time of the fuel cell is when the start switch is turned on after a lapse of a predetermined period of time after the start switch has been turned off in the normal power generation state.

7. The fuel cell system according to claim 1 further comprising a pump between the fuel chamber and the discharge valve, wherein the pressure regulating means includes a pressure regulating valve for changing the supply pressure of the fuel gas between the start-up power generating state and the normal power generating state, and control means which opens the pressure regulating valve at the same time of startup of power generation and then drives the pump to establish a negative pressure inside the fuel chamber.

8. The fuel cell system according to claim 1 wherein, during the start-up power generating state, residual air is discharged from the fuel chamber and out of the fuel cell system through the opened discharge valve and gas discharge line.

9. The fuel cell system according to claim 1, further comprising:
    a gas outflow line connected at one end to the fuel chamber, the gas discharge line being connected to the gas outflow line;
    a gas inflow line connected at one end to the fuel chamber and at its opposite end to the gas outflow line;
    a pump located in the gas outflow line between the fuel chamber and the gas discharge line; and the gas outflow line and the gas inflow line forming a gas circulating loop through the fuel chamber and the pump.

10. A fuel cell system comprising:

at least one fuel cell having a fuel chamber including a fuel electrode, an oxygen chamber including an oxygen electrode and an electrolyte layer interposed between the fuel electrode and the oxygen electrode;

a gas discharge line for discharging residual air from the fuel chamber;

a hydrogen concentration sensor for detecting hydrogen concentration in gas exiting the fuel chamber;

an oxygen concentration sensor for detecting oxygen concentration in gas exiting the fuel chamber;

a discharge valve in the fuel gas discharge line; and pressure regulating means for regulating a supply pressure of a flow of fuel gas supplied to the fuel chamber at a first pressure, higher than a second pressure used in normal power generation, during a start-up power generating state when the fuel cell starts up power generation with opening of the discharge valve, until the detected concentration of the fuel gas in the fuel chamber exceeds a predetermined gas concentration, and for reducing the supply pressure of the flow of fuel gas to the fuel chamber to the second pressure, lower than the first pressure, and closing the discharge valve when the detected concentration of the fuel gas in the fuel chamber exceeds the predetermined gas concentration, to thereby establish a normal power generating state in which a flow of fuel gas into the fuel chamber is maintained at the second pressure for generating electric power;

wherein the pressure regulating means reduces the supply pressure of the flow of fuel gas to the second pressure and closes the discharge valve only when the detected oxygen concentration equal to or less than a predetermined oxygen concentration.

* * * * *